United States Patent
Bergström et al.

(10) Patent No.: US 9,503,246 B2
(45) Date of Patent: Nov. 22, 2016

(54) UPLINK TIMING ERROR REDUCTION METHOD AND APPARATUS

(71) Applicant: Telefonaktiebolaget LM Ericsson (publ), Stockholm (SE)

(72) Inventors: Mattias Bergström, Stockholm (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 14/398,494

(22) PCT Filed: Oct. 17, 2012

(86) PCT No.: PCT/SE2012/051111
§ 371 (c)(1),
(2) Date: Nov. 3, 2014

(87) PCT Pub. No.: WO2013/169162
PCT Pub. Date: Nov. 14, 2013

(65) Prior Publication Data
US 2015/0085839 A1    Mar. 26, 2015

Related U.S. Application Data

(60) Provisional application No. 61/645,198, filed on May 10, 2012.

(51) Int. Cl.
*H04J 3/00* (2006.01)
*H04L 5/00* (2006.01)
(Continued)

(52) U.S. Cl.
CPC .............. *H04L 5/0078* (2013.01); *H04J 3/16* (2013.01); *H04W 56/0045* (2013.01)

(58) Field of Classification Search
CPC ................................ H04L 5/0078; H04J 3/16
(Continued)

(56) References Cited

U.S. PATENT DOCUMENTS

2011/0158116 A1    6/2011  Tenny et al.
2012/0250520 A1*  10/2012  Chen et al. ............. H04L 5/001
                                                      370/241
(Continued)

OTHER PUBLICATIONS

Samsung: "Handling Uplink Transmission Timing", 3GPP Draft; Tdoc R2-090546, 3rd Generation Partnership Project (3GPP), Mobile Competence Centre ; 650, Route Des Lucioles; F-06921 Sophia-Antipolis Cedex; France, Document for Discussion, Agenda Item No. 6.1.1.4, Ljubljana, Slovenia; Jan. 16, 2009, XP050322461, [retrieved on Jan. 16, 2009] consisting of 5-pages.
(Continued)

*Primary Examiner* — Iqbal Zaidi
(74) *Attorney, Agent, or Firm* — Christopher & Weisberg, P.A.

(57) ABSTRACT

The technology presented in this disclosure pertains to telecommunication. For example, there is presented a method of operating a wireless terminal 30. A timing advance command (TAC) control element (CE) is received over a radio interface (from a network node 28). Upon receipt of the TAC CE, the method continues by updating UL (uplink) transmission timing for cells in a timing advance (TA) group even when a TA timer for the associated TA group is not running.

27 Claims, 15 Drawing Sheets

(51) Int. Cl.
*H04W 56/00* (2009.01)
*H04J 3/16* (2006.01)
(58) Field of Classification Search
USPC .......................... 455/418–506; 370/328–350
See application file for complete search history.

(56) References Cited

U.S. PATENT DOCUMENTS

2013/0250925 A1\* 9/2013 Lohr et al. ........ H04W 56/0045
370/336
2013/0279433 A1\* 10/2013 Dinan ............... H04W 56/0005
370/329

OTHER PUBLICATIONS

ITRI: "Considerations on TAT for Multiple TAs", 3GPP Draft; R2-113193_V2, 3rd Generation Partnership Project (3GPP), Mobile Competence Centre ; 650, Route Des Lucioles; F-06921 Sophia-Antipolis Cedex; France, vol. RAN WG2, Document for Discussion and Decision, Agenda Item No. 7.1.1, Barcelona, Spain; May 3, 2011, XP050495363, [retrieved on May 3, 2011] consisting of 5-pages.
New Postcom: "TAT Related Considerations for Multiple TAs", 3GPP Draft; R2-114121, 3rd Generation Partnership Project (3GPP), Mobile Competence Centre ; 650, Route Des Lucioles; F-06921 Sophia-Antipolis Cedex; France,, vol. RAN WG2, Meeting #75, Document for Discussion and Decision, Agenda Item No. 7.1.1.1, Athens, Greece; Aug. 22, 2011, XP050539968, [retrieved on Aug. 22, 2011] consisting of 5-pages.
Ericsson: "Summary of e-mail discussion [77#26] LTE: CA: Timing Reference for SCell-only TA groups", 3GPP Draft; Tdoc R2-121557, 3rd Generation Partnership Project (3GPP), Mobile Competence Centre ; 650, Route Des Lucioles; F-06921 Sophia-Antipolis Cedex; France, vol. RAN WG2, Document for Summary of Email Discussion, Agenda Item No. 7.1.2.2, Jeju, Korea; Mar. 26, 2012, XP050606510, [retrieved on Mar. 26, 2012] consisting of 19-pages.
International Search Report and Written Opinion dated Mar. 26, 2013 for International Application No. PCT/SE2012/051111, International Filing Date: Oct. 17, 2012 consisting of 16-pages.

\* cited by examiner

- 1ST EMBODIMENT: DL RECEPTION TIMING OFFSET BY $N_{TA\_Ref} + N_{TA\_offset}$
- 2nd EMBODIMENT: DL RECEPTION TIMING OFFSET BY $N_{TA}$
- 3rd EMBODIMENT: AUTONOMOUSLY UPDATE UL TIMING ADJUSTMENT TO FOLLOW THE DL CELL TRANSMISSION TIMING IN EACH TA GROUP

UPLINK TIMING ERROR REDUCTION METHOD AND APPARATUS

TECHNICAL FIELD

The technology presented in this disclosure relates to telecommunications, and particularly to methods and apparatuses for transmitting information on an uplink (UL) from a wireless terminal to a network node.

BACKGROUND 1.0 Telecommunications Networks

In a typical cellular radio system, wireless terminals (also known as mobile stations and/or user equipments (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS, i.e. Universal Mobile Telecommunications System) or "eNodeB" or "eNB" (LTE, i.e. Long Term Evolution,). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.
2.0 UMTS The Universal Mobile Telecommunications System (UMTS) is a third generation mobile communication system, which evolved from the second generation (2G) Global System for Mobile Communications (GSM). The Universal Terrestrial Radio Access Network (UTRAN) is essentially a radio access network using wideband code division multiple access (WCDMA) for user equipment units (UEs). In a forum known as the Third Generation Partnership Project (3GPP), telecommunications suppliers propose and agree upon standards for third generation networks and UTRAN specifically, and investigate e.g. enhanced data rate and radio capacity.
3.0 Long Term Evolution (LTE)

The 3GPP has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (i.e. eNodeBs in LTE) and AGWs. As such, the radio access network (RAN) of an LTE system has an essentially "flat" architecture comprising radio base station nodes without reporting to radio network controller (RNC) nodes.

3.1 LTE Overview

LTE uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms., as shown by FIG. 2.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink (DL) transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information. A downlink system with CFI=3 OFDM symbols as control is illustrated in FIG. 3.

3.2 Carrier Aggregation

The LTE Rel-10 specifications (i.e. LTE Release 10 specifications; hereinafter Release is abbreviated Rel) have been standardized, supporting Component Carrier (CC) bandwidths up to 20 MHz (which is the maximal LTE Rel-8 carrier bandwidth). An LTE Rel-10 operation wider than 20 MHz is possible and appear as a number of LTE CCs to an LTE Rel-10 terminal, i.e. a UE supporting LTE Rel-10. The straightforward way to obtain bandwidths wider than 20 MHz is by means of Carrier Aggregation (CA). CA implies that an LTE Rel-10 terminal can receive multiple CCs, where the CC has, or at least the possibility to have, the same structure as a Rel-8 carrier. CA is illustrated in FIG. 4.

The Rel-10 standard supports up to 5 aggregated CCs where each CC is limited in the RF specifications to have a one of six bandwidths namely 6, 15, 25, 50, 75 or 100 RB (corresponding to 1.4, 3 5 10 15 and 20 MHz respectively).

The number of aggregated CCs as well as the bandwidth of the individual CCs may be different for uplink and downlink. A symmetric configuration refers to the case where the number of CCs in downlink (DL) and uplink (UL) is the same whereas an asymmetric configuration refers to the case that the number of CCs is different in DL and UL. It is important to note that the number of CCs configured in the network may be different from the number of CCs seen by a terminal: A terminal may for example support more downlink CCs than uplink CCs, even though the network offers the same number of uplink and downlink CCs.

CCs may also be referred to as cells or serving cells. More specifically, in an LTE network the cells aggregated by a terminal are denoted primary Serving Cell (PCell) and secondary Serving Cells (SCells). The term serving cell comprises both PCell and SCells. All UEs have one PCell. Which cell is a UEs PCell is terminal-specific and is considered "more important", i.e. vital control signaling and other important signaling is typically handled via the PCell. Uplink control signaling is always sent on a UEs PCell. Thus, unless it can be multiplexed with other uplink data, uplink control signaling is sent on a UEs PCell. The component carrier configured as the PCell is the primary CC whereas all other component carriers are secondary serving cells.

During initial access a LTE Rel-10 terminal behaves similar to a LTE Rel-8 terminal, i.e. a terminal supporting LTE Rel-8. However, upon successful connection to the network a Rel-10 terminal may—depending on its own capabilities and the network—be configured with additional serving cells in the UL and DL. Configuration is based on Radio Resource Control (RRC). Due to the heavy signaling and rather slow speed of RRC signaling it is envisioned that a terminal may be configured with multiple serving cells even though not all of them are currently used.

3.3 SCell Activation and Deactivation

With the concept of SCells, i.e. a UE having more than one serving cell in carrier aggregation as discussed above, additional bandwidth resources could be configured/deconfigured dynamically. In this regard, it should be appreciated that the use of "/" is used to mean "and/or" throughout this disclosure. The configuration/deconfiguration of cells are signaled by the eNB and performed with RRC signaling which is heavy signaling and slow. Since RRC signaling is heavy and slow the concept of activation/deactivation was introduced for SCells. The eNB has the possibility to deactivate a UE's serving cells which the eNB decides which that UE should not use for the moment. Activation/deactivation is performed with MAC signaling which is faster. The activation/deactivation procedure is described in detail in section 5.13 of 3GPP TS 36.321, V10.5.0 (2012-03) 3rd Generation Partnership Project; Technical Specification Group Radio Access Network; Evolved Universal Terrestrial Radio Access (E-UTRA); Medium Access Control (MAC) protocol specification (Release 10). Each SCell is configured with a SCellIndex, which is an identifier or so called Cell Index which is unique among all serving cells configured for this UE. The PCell always have Cell Index 0 and and SCell can have an integer cell index of 1 to 7.

The Rel-10 Activation/Deactivation MAC control element (CE) is defined in section 6.1.3.8 of 3GPP TS 36.321, V10.5.0 (2012-03). The Activation/Deactivation MAC CE consists of a single octet containing seven C-fields and one R-field. Each C-field corresponds to a specific SCellIndex and indicates whether the specific SCell is activated or deactivated. The UE will ignore all C-fields associated with Cell indices not being configured. The Activation/Deactivation MAC CE always indicates the activation status of all configured SCells, meaning that if the eNB wants to activate one SCell it has to include all configured SCells, setting them to activated or deactivated even if their status has not changed.

The UE is generally required to monitor the control channel, PDCCH, and data channel, PDSCH, of every serving cell. In carrier aggregation a UE is configured with at least one SCell. The UE's configured SCell can be activated or deactivated by the serving network node. Therefore if a UE's SCell is activated it would imply that the UE has to monitor PDCCH and PDSCH for that serving cell. This implies a wider receiver bandwidth, higher sampling rates, etc. resulting in high power consumption compared to if that serving cell would have been deactivated.

3.4 Timing Alignment of Signals Received at eNode B

In order to preserve the orthogonality in UL, the UL transmissions from multiple UEs need to be received time aligned at the eNB. This means the transmit timing of the UEs, which are under the control of the same eNB, should be adjusted to ensure that their received signals arrived at the eNB receiver at the same time—more specifically well within the cyclic prefix (CP). This ensures that the eB receiver is able to use the same resources (i.e. same DFT or FFT resource) to receive and process the signals from multiple UEs.

Since UEs may be located at different distances from the eNB (see FIG. 5), the UEs will need to initiate their UL transmissions at different times. A UE far from the eNB generally needs to start transmission earlier than a UE close to the eNB. This can for example be handled by time advance of the UL transmissions, i.e. a UE starts its UL transmission before a nominal time given by a timing reference. This concept is illustrated in FIG. 6. In other words, a UE may start its UL transmission at a time, given by a timing advance value, before a nominal time given by a timing reference, or timing reference value.

The UL timing advance is maintained by the eNB through timing advance commands transmitted to a UE based on measurements on UL transmissions from that UE, i.e. the same UE. Through timing advance commands, the UE is ordered to start its UL transmissions earlier or later than current UL transmission timing. That is, the timing advance (TA) value can be increased or decreased, respectively.

There is a strict relation between DL transmissions and the corresponding UL transmission. Examples of this include the timing between a DL-SCH transmission on PDSCH to the HARQ ACK/NACK feedback transmitted in UL (either on PUCCH or PUSCH); and the timing between an UL grant transmission on PDCCH to the UL-SCH transmission on PUSCH.

By increasing the timing advance value for a UE, the UE processing time between the DL transmission and the corresponding UL transmission decreases. For this reason, an upper limit on the maximum timing advance has been defined by 3GPP in order to set a lower limit on the processing time available for a UE. For LTE, this value has been set to roughly 667 µs which corresponds to a cell range of roughly 100 km (note that the TA value compensates for the round trip delay).

In LTE Rel-10 there is only a single timing advance (TA) value per UE and all UL cells are assumed to have the same transmission timing. The timing reference point for the TA is the receive timing of the primary DL cell.

In LTE Rel-11, support for multiple TA values was introduced and one UE may have different TA values for different cells. One reason for the introduction of multiple TA values is that a UE should support UL transmission to multiple UL reception points. As in general a UE have different round trip delay to different physical nodes, the UE will, in general, need different TA values to these different physical nodes. A UE might also need different TA values for UL transmissions to cells in different bands. The UE's UL serving cells terminating at the same physical node or at the co-located physical nodes (e.g. co-located eNodeB) have same or similar TA values for said UE. Therefore the possibility to configure multiple TA groups (TAGs) has been specified in 3GPP standard and can be used when a UE has 2 or more UL serving cells. The criterion to group cells within a TA group (TAG) depends upon network implementation. For example, typically the UE's UL serving cells terminating at the same or co-located node are grouped by the network in the same TAG. TA grouping can thus be done for example depending on deployment where UL serving cells terminated at the same physical node will be grouped into the same TA group. In other words, the current assumption in 3GPP is that the serving cells of a UE which the eNB considers suit to use the same TA value will be grouped together in the so called TA group. TA grouping will be signalled by the network (NW) by RRC signalling. Or said differently, the information relating to TA grouping is signalled to the UE by the NW via RRC signalling. As is understood, Serving cells in the same TA group will share TA value. Also, the DL of one serving cell in the TA group will be used as timing reference. Thus, the DL of one serving cell in the TA group will be used as timing reference for the UE for deriving its UL transmit timing of all cells belonging to the same TAG. To each TA value there is an associated timer, called TA timer. The UE assumes that all the UL serving cells in the same TA group to be time aligned when the associated TA timer is running. If the serving cells in the TAG are considered to be time aligned the UE is allowed to perform PUCCH, PUSCH and SRS transmissions on one or more of the serving cells. A TA timer is started or restarted upon reception of a TA command addressed to the associated TA group. TA commands are discussed further in section 3.6 hereof.

3.5 Random Access

In LTE, as in any communication system, a mobile terminal (e.g. UE) may need to contact the network (via the eNodeB) without having a dedicated resource in the Uplink (i.e. from UE to base station). To handle this, a random access procedure is available where a UE (that does not have a dedicated UL resource) may transmit a signal to the base station. The first message (MSG1 or preamble) of this procedure is typically transmitted on a special resource reserved for random access, a physical random access channel (PRACH). This channel can for instance be limited in time and/or frequency (as in LTE). See FIG. 7. The resources available for PRACH transmission is provided to the terminals as part of the broadcasted system information (or as part of dedicated RRC signaling in case of e.g. handover).

In LTE, the random access procedure can be used for a number of different reasons. Among these reasons are:
  Initial access (for UEs in the LTE_IDLE or LTE_DE-TACHED states)
  Incoming handover
  Resynchronization of the UL
  Scheduling request (for a UE that is not allocated any other resource for contacting the base station)
  Positioning The contention-based random access procedure used in LTE is illustrated in FIG. 8. The UE starts the random access procedure by randomly selecting one of the preambles available for contention-based random access. The UE then transmits the selected random access preamble on the physical random access channel (PRACH) to eNB in RAN.

The RAN acknowledges any preamble it detects by transmitting a random access response (MSG2) including an initial grant to be used on the uplink shared channel, a temporary C-RNTI, and a time alignment (TA) update based on the timing offset of the preamble measured by the eNodeB on the PRACH. The MSG2 is transmitted in the DL to the UE and its corresponding PDCCH message CRC is scrambled with the RA-RNTI.

When receiving the random access response (MSG2) the UE uses the grant to transmit a message (MSG3) that is used, in part, to trigger the establishment of radio resource control and, in part, to uniquely identify the UE on the common channels of the cell. The timing advance command provided in the random access response is applied in the UL transmission in MSG3. The eNB can change the resources blocks that are assigned for a MSG3 transmission by sending an UL grant that's CRC is scrambled with the TC-RNTI.

The MSG4 which is then used for contention resolution has its PDCCH CRC scrambled with the C-RNTI if the UE previously has a C-RNTI assigned. If the UE does not have a C-RNTI previously assigned has its PDCCH CRC is scrambled with the TC-RNTI. That is to say, if the UE is not previously assigned a C-RNTI then the CRC of the PDCCH contained in the MSG4 is scrambled with the TC-RNTI.

The procedure ends with RAN solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that needs to be resolved through the contention resolution message (MSG4). The case when contention occurs is illustrated in FIG. 9, where two UEs transmit the same preamble, $p_5$, at the same time. A third UE also transmits at the same RACH, but since it transmits with a different preamble, $p_1$, there is no contention between this UE and the other two UEs.

The UE can also perform non-contention based random access. A non-contention based random access or contention free random access can e.g. be initiated by the eNB to get the UE to achieve synchronisation in UL. The eNB initiates a non-contention based random access either by sending a PDCCH order or indicating it in an RRC message. The later of the two is used in case of handover (HO).

The eNB can also order the UE through a PDCCH message to perform a contention based random access; the procedure for this is illustrated in FIG. 9. The procedure for the UE to perform contention free random access is illustrated in FIG. 10. Similar to the contention based random access the MSG2 is transmitted in the DL to the UE and its corresponding PDCCH message CRC is scrambled with the RA-RNTI. The UE considers the contention resolution successfully completed after it has received MSG2 successfully.

For the contention free random access as for the contention based random access the MSG2 contain a timing alignment value. This enables the eNB to set the initial/updated timing according to the UEs transmitted preamble.

In LTE Rel-10, the random access procedure is limited to the primary cell only. This implies that the UE can only send a preamble on the primary cell. Further MSG2 and MSG3 is only received and transmitted on the primary cell. MSG4 can however, in Rel-10, be transmitted on any DL cell.

In LTE Rel-11, the current assumption (RAN2#75, August 2011) is that the random access procedure will be supported also on secondary cells, at least for the UEs supporting Rel-11 carrier aggregation (CA). So far only network initiated random access on SCells is assumed.

3.6 Initial TAC and Subsequent TAC

TA values are used by the UE to offset the UL transmission timing relative to a reference. The current assumption in 3GPP is that the DL reception timing of a serving cell is used as timing reference and the UL transmission timing will be offset relative to the DL reception timing of that, so called, timing reference cell. At preamble transmission the UE uses a TA value of zero and the preamble will therefore be transmitted at the time of DL reception of the timing reference cell. When the eNB receives the preamble it measures the time misalignment of wanted UL reception timing on the cell on which the preamble was transmitted and the actual UL timing of the preamble. Based on this measured misalignment the eNB creates an initial TA command (TAC) which is sent to the UE in the random access response message (MSG2). When the UE receives this TA command it will apply the indicated TA value to the TA group which the cell which performed the preamble transmission. The TA value tells the UE how much to advance the UL transmission in subsequent UL transmissions on the cells belonging to that TA group.

Because a UE can move and the round trip time to the UL reception points can change, and the TA values might then become inaccurate. Therefore, when receiving UL transmissions from a UE on a cell the eNB measures the time misalignment of the UL signals from that UE on that cell. If measured time misalignment of the UL signals from that UE on a cell is, by the eNB, judged to be too large, the eNB can create a TA command message containing a delta update to the TA value used by that UE. The UE will, when receiving such a TA command, increase or decrease the TA value according to the delta update.

The initial TA command is an 11 bit long value and is sent in the random access response message. An initial TA command tells the UE how much the addressed TA value should be advanced. The addressed TA value is the TA value which is associated with the TA group to which the cell where the preamble was sent, or put in other words. If a UE perform random access on a cell belonging to a TA group x then the TA value associated with TA group x is the addressed TA value. Subsequent TA commands are 6 bit long values and are sent in TA command MAC Control Elements (CEs) which aside from the TA command itself also contains a TA group identity and the TA value associated with the identified TA group is the addressed TA value. A TA command tells the UE how much the TA value should be advanced.

It has recently been agreed in 3GPP that for the serving cells in the same TA group as the PCell the DL reception timing of the PCell should be the timing reference. So, in a TAG containing PCell (also known as PCell TAG (pTAG)), the UE uses PCell as the reference cell for deriving the UE transmit timing for all serving cells in the pTAG. When the UE is configured with a TAG containing only SCells (also known as SCell TAG (sTAG)), the UE may use any activated SCell from the sTAG for deriving the UE transmit timing for all SCells in the sTAG. For serving cells in a TA group not containing the PCell the DL reception timing of a serving cell selected by the UE should be used as timing reference.

When receiving a TA command, initial or subsequent, the UE will apply the TA command and start the associated TA timer. The UE will consider the serving cells belonging to a TA group as UL in-synch, i.e. UL time aligned, as long as the associated TA timer is running. When the UE is considering a cell UL time aligned normal UL transmissions are allowed while when a cell is not considering UL time alignment only PRACH transmissions are allowed.

3.7 Autonomous Uplink Timing Adjustment

In addition to the TA based adjustment of the UL transmit timing, in the existing solutions there is also pre-defined requirement on the UE to autonomously adjust its UL timing in response to the drift in the eNB transmit timing. More specifically the UE is required to follow the change in the frame transmit timing of the serving cell and correspondingly adjust its transmit timing for each transmission. The UE typically uses some sort of reference signals to track the downlink timing of the serving cell e.g. common reference signal, synchronization signals, etc.

The serving cell timing may change due to different reasons e.g. due to variation in radio conditions, imperfection in clocks, maintenance activities, deliberate attempt by the network to change timing etc. In addition it is also required that the UE changes its timing (increase or decrease) with certain rate. This is to make sure that the UE does not change the timing too fast. This requirement stems from the fact that if the UE changes its timing in the order of several μs (e.g. 3-4 μs) from subframe to subframe, the base station receiver may not be able to cope with the received signals. This will result in degradation of demodulation of signals transmitted by the UE e.g. result in uplink throughput loss.

This autonomous UL timing adjustment is (in LTE) realized by the fact that each TA value ($N_{TA}$) has a reference TA value ($N_{TA\_Ref}$). The UE is (in LTE) required to follow the frame timing change of the serving cell or of the timing reference cell if there are more than one serving cell in a TAG. This is also called the autonomous UL timing adjustment since it is autonomously performed by the UE based on pre-defined rules and requirements. The uplink frame transmission takes place ($N_{TA}+N_{TA\_offset}$)×$T_s$ before the reception of the first detected path (in time) of the corresponding downlink frame from the reference cell. Where $T_s$ is a basic time unit defined as: $T_s=1/(15000\times2048)$ seconds. $N_{TA}$ is the currently used TA value. $N_{TA\_Ref}$ is the TA value which has been signaled by the network and is used to determine the reference timing of UL transmission. This reference timing is ($N_{TA\_Ref}+N_{TA\_offset}$) before the downlink reception timing. $N_{TA\_offset}$ is a fixed value. When multiple TAGs are used the UE is required to autonomous adjusts its UL timing adjustment for UL transmissions for cells in each TA group. Therefore each TA in a TAG is associated with a reference TA value ($N_{TA\_Ref}$). The goal of the autonomous uplink timing adjustment is to reduce the difference between the reference timing and the actual uplink timing below a certain threshold. If the downlink reception timing changes by a time t the reference timing will be changed by a time t in the same direction which can result in an increase in the difference between the reference timing and the actual UL timing. This is illustrated, for example, in FIG. 11 and FIG. 12. At time t1 shown in FIG. 11 there is a small difference between the reference timing and the actual UL timing, i.e. $T_e$ is small. FIG. 12 illustrates a possible later state at time t3 where the DL timing has been delayed, which could for example happen due to that the DL transmission timing has been delayed. If $T_e$ is larger than a threshold the UE is required to adjust the UL transmission timing. This is done by adjusting $N_{TA}$ and is illustrated in FIG. 16.

Whenever a TAC MAC CE is received the UE will update, i.e. advance or delay, the currently used UL transmission timing according to the value in the received TAC and the reference timing is changed to be the updated UL transmission timing. Or in other words; whenever a UE is applying the value of a TAC MAC CE to the addressed cell and/or TAG the UE will update the UL transmission timing of that cell and/or TAG, update $N_{TA}$ to be DL timing minus the new, updated, Actual UL timing and $N_{TA\_Ref}$ so that $N_{TA\_Ref}+N_{TA\_offset}=N_{TA}$.

4.0 Problems, or Disadvantages, with Existing Technology

With the current LTE specification the UE will only perform autonomous UL transmission timing adjustments when performing UL transmission. If the UE is not performing any UL transmissions for a period of time during which the DL timing has drifted there is a risk that $T_e$ (transmission timing error) has increased above the threshold for triggering of autonomous UL transmission timing adjustment. The UE adjust UL transmission timing when it performs UL transmission. Due to inactivity or lack of UL grant the UE may not transmit in every subframe or transmission occasion. Therefore, the next UL transmission timing adjustment will be performed by the UE at the next UL transmission.

When a TA group's TA timer has expired, the UE is prohibited to perform any UL transmissions and it would therefore not perform any UL transmission timing adjustment for that TA group. That is to say that when a TA group's TA timer has expired, the UE is generally prohibited from performing any UL transmissions on the cells in that TAG and it would therefore not perform any UL transmission timing adjustment for the TA group in question.

One possible procedure the eNB can use to manage a UE's UL transmissions on a serving cell is by utilizing the TA timer associated with that serving cell. If the eNB wants to stop a UE's UL transmission on a serving cell it could stop sending TAC MAC CEs addressed to that serving cell's TA group and hence the TA timer would expire (given that the timer has a finite value) and thereby the UE would not be allowed to perform UL transmissions on the serving cells in that TA group. If at a later stage the eNB wants that UE to resume UL transmissions on a serving cell belonging to a TA group with an expired TA timer it could send a TAC MAC CE addressed to that serving cell's TA group which would update the associated TA value and start the associated TA timer. In such a scenario it is likely that the eNB has, by some means, interpreted the UE as non-moving, or slowly moving, so that the TA values maintained by the UE would still be valid even though the associated TA timer has expired. A problem arises if the DL transmission timing has drifted during the period of time when the TA timer has not been running and the UE is therefore not allowed to perform UL transmission and therefore not performing autonomous UL transmission timing adjustments to compensate for the drift in DL reception timing. The actual UL timing would in such a scenario be faulty and if the UE receives a TAC MAC CE the UE will update this, faulty, actual UL timing according to the TAC MAC CE and restart the associated TA timer which would resume UL transmissions on that serving cell with a faulty TA value which may lead to substantial performance degradation at the base station receiver in case there is a large error in UL transmission timing, e.g. in the order of few μs such as 2-4 μs. The problem is further accentuated in case of for example when there is sudden change in propagation conditions, drift due to imperfection in clocks, maintenance work at the base station etc. Hence the aggregated time misalignment may momentarily become significantly large. Therefore there is a need to define a mechanism to ensure that the UE does not use faulty UL transmission timing in the mentioned scenario.

SUMMARY

In one of its aspects the technology disclosed herein concerns a wireless terminal of a telecommunications network. In an example embodiment the wireless terminal comprises a communications interface and an UL transmission timing update unit. The communications interface is configured to receive a timing advance command (TAC) control element (CE) over a radio interface from a base station node. The UL transmission timing update unit (also known as a controller, or UL transmission timing updating means) is configured, upon receipt of the timing advance command (TAC) control element (CE), to update UL transmission timing for cells in a timing advance (TA) group even when the TA timer for the associated TA group is not running. In some example embodiments the UL transmission timing update unit is configured to update the UL transmission timing for cells in a timing advance (TA) group to be a DL reception timing of that TA group offset by a particular offset quantity.

In an example embodiment and mode the UL transmission timing update unit is configured, upon receipt of the timing advance command (TAC) control element (CE), to update UL transmission timing for cells in a timing advance (TA) group to be a DL reception timing of that TA group offset by a sum of a timing advance reference value ($N_{TA\_Ref}$) and a timing advance offset value ($N_{TA\_offset}$), e.g., the offset quantity is ($N_{TA\_Ref}+N_{TA\_offset}$).

In another example embodiment and mode the UL transmission timing update unit is configured, upon receipt of the timing advance command (TAC) control element (CE), to update UL transmission timing for cells in a timing advance (TA) group to be a DL reception timing of that TA group offset by a currently used timing advance value ($N_{TA}$), e.g., the offset quantity is ($N_{TA}$).

In yet another example embodiment and mode the UL transmission timing update unit is configured to update UL transmission timing for cells in a timing advance (TA) group by performing autonomous UL timing adjustment to follow the DL cell transmission timing in each TA group when the TA timer is not running even if there is no UL transmission on concerned serving cells. In an example implementation, the UL transmission timing update unit is further configured to adjust its UL timing when there is an UL transmission and when there is no UL transmission by keeping its transmitter active to some extent even when not transmitting in the uplink.

In yet another example embodiment and mode the wireless terminal comprises means for informing the network node that that the wireless terminal is capable of updating UL transmission timing for cells in the timing advance (TA) group even when the TA timer for the associated TA group is not running.

In yet another example embodiment and mode the wireless terminal is further configured to make a selection between plural different updating modes for updating the UL transmission timing for the cells in the timing advance (TA) group even when the TA timer for the associated TA group is not running.

In another of its example aspects the technology disclosed herein concerns a network node which comprises means for making a selection between plural different updating modes for use by the wireless terminal for updating the UL transmission timing for cells in a timing advance (TA) group, the different modes comprising respective different ways of updating the UL transmission timing for the cells in a timing advance (TA) group even when the TA timer for the associated TA group is not running.

In yet another aspect of the technology, there is provided a wireless terminal comprising: a communications interface configured to receive a timing advance command control element over a radio interface from a network node; and an uplink, UL, transmission timing update unit configured, upon receipt of the timing advance command control element, to update UL transmission timing for cells in a timing advance, TA, group even when a TA timer for the associated TA group is not running. The UL transmission timing update unit may, e.g., be a controller.

The UL transmission timing update unit may be configured to update the UL transmission timing for the cells in the TA group to be a downlink, DL, reception timing of that TA group offset by a offset quantity.

The UL transmission timing update unit may be configured to update UL transmission timing for the cells in the TA group to be a DL reception timing of that TA group offset by a sum of a timing advance reference value ($N_{TA\_Ref}$) and a timing advance offset value ($N_{TA\_offset}$).

The UL transmission timing update unit may be configured to update UL transmission timing for cells in a TA group to be a DL reception timing of that TA group offset by a currently used timing advance value ($N_{TA}$).

In one example embodiment, the UL transmission timing update unit may be configured to update UL transmission timing for cells in a TA group by performing autonomous UL timing adjustment to follow the DL cell transmission timing in each TA group when the TA timer is not running even if there is no UL transmission on the concerned cells.

In another example embodiment, the UL transmission timing update unit may be configured to update UL transmission timing for cells in a TA group by performing autonomous UL timing adjustment to follow the DL cell transmission timing in each TA group when the TA timer is not running even if there is no UL transmission on the cells belonging to the same TA group.

The UL transmission timing update unit may be further configured to adjust its UL timing when there is an UL transmission and when there is no UL transmission by keeping its transmitter active even when not transmitting in the uplink.

The UL transmission timing update unit may be further configured to adjust its UL timing regardless of whether there is an UL transmission or not by keeping its transmitter active even when not transmitting in the uplink.

The UL transmission timing update unit may be further configured to keep its transmitter active even when not transmitting in the uplink in accordance with slew rate parameters selected for operation of the transmitter when the transmitter is not transmitting in the uplink, wherein the slew rate parameters are parameters associated with the rate at which the wireless terminal (30) performs UL timing adjustments.

In an example embodiment, the wireless terminal further comprises means for informing the network node that the wireless terminal is capable of updating UL transmission timing for cells in the TA group even when the TA timer for the associated TA group is not running. The means for informing the network may comprise a capabilities notification unit. Additionally, or alternatively, the means for informing the network may comprise a transmitter or a transceiver.

In another example embodiment, the communications interface is configured to inform the network node that the wireless terminal is capable of updating UL transmission timing for cells in the TA group even when the TA timer for the associated TA group is not running.

The wireless terminal may be further configured to make a selection between plural different updating modes for updating the UL transmission timing for the cells in the timing advance TA group even when the TA timer for the associated TA group is not running. The wireless terminal may be further configured to make the selection based on a received information from the network node and/or according to one or more pre-defined rules.

The above-mentioned cells in the TA group may be serving cells in the TA group.

According to another aspect of the technology, there is provided a method of operating a wireless terminal comprising: receiving a timing advance command control element over a radio interface from a network node; and upon receipt of the timing advance command control element, updating uplink, UL, transmission timing for cells in a timing advance, TA, group even when a TA timer for the associated TA group is not running.

The method may further comprise updating the UL transmission timing for the cells in the TA group to be a downlink, DL, reception timing of that TA group offset by an offset quantity.

The method may further comprise updating the UL transmission timing for the cells in the TA group to be a downlink, DL, reception timing of that TA group offset by a sum of a timing advance reference value ($N_{TA\_Ref}$) and a timing advance offset value ($N_{TA\_offset}$). The method may further comprise updating the UL transmission timing for the cells in the TA group to be a DL reception timing of that TA group offset by a currently used timing advance value ($N_{TA}$).

The method may further comprise updating UL transmission timing for cells in a TA group by performing autonomous UL timing adjustment to follow the DL cell transmission timing in each TA group when the TA timer is not running even if there is no UL transmission on concerned serving cells.

The method may further comprise updating UL transmission timing for cells in a TA group by performing autonomous UL timing adjustment to follow the DL cell transmission timing in each TA group when the TA timer is not running even if there is no UL transmission on the cells belonging to the same TA group.

The method may further comprise updating the UL timing when there is an UL transmission and when there is no UL transmission keeping a transmitter of the wireless terminal active even when not transmitting in the uplink.

In one embodiment, the method further comprises adjusting the UL timing regardless of whether there is an UL transmission or not by keeping its transmitter active even when not transmitting in the uplink.

The method may additionally comprise keeping the transmitter active even when not transmitting in the uplink in accordance with slew rate parameters selected for operation of the transmitter when the transmitter is not transmitting in the uplink, wherein the slew parameters are parameters associated with the rate at which the wireless terminal performs UL timing adjustments.

The method may further comprise informing the network node that that the wireless terminal is capable of updating UL transmission timing for cells in the TA group even when the TA timer for the associated TA group is not running.

The method may further comprise making a selection between plural different updating modes for updating the UL transmission timing for the cells in the TA group even when the TA timer for the associated TA group is not running.

The method may further comprise making the selection based on a received information from the network node and/or according to one ore more pre-defined rules.

According to yet another aspect of the technology, there is provided a network node comprising: a communications interface configured to communicate information over a radio interface with a wireless terminal; and means for making a selection between plural different updating modes for use by the wireless terminal for updating the uplink, UL, transmission timing for cells in a timing advance, TA, group, the different modes comprising respective different ways of updating the UL transmission timing for the cells in a TA group even when a TA timer for the associated TA group is not running.

In an example embodiment, the means for making a selection between plural different updating modes is configured to make the selection between the following updating modes: i) updating the UL transmission timing for the cells in the TA group to be a downlink, DL, reception timing of that TA group offset by a offset quantity; ii) updating the UL transmission timing for the cells in the TA group to be a downlink, DL, reception timing of that TA group offset by a sum of a timing advance reference value ($N_{TA\_Ref}$) and a timing advance offset value ($N_{TA\_offset}$); iii) updating the UL transmission timing for the cells in the TA group to be a DL reception timing of that TA group offset by a currently used timing advance value ($N_{TA}$); and iv) updating UL transmission timing for cells in a TA group by performing autonomous UL timing adjustment to follow the DL cell transmission timing in each TA group when the TA timer is not running even if there is no UL transmission on concerned serving cells.

The means for selection may be configured to make the selection between plural different updating modes for use by the wireless terminal based on one or more of the following criteria: Residual transmission timing error after UL transmission timing adjustment; Current UL transmission error; Frequent and/or large DL timing drifting; Criticality of data or services; Radio environment or radio channel characteristics.

The network node may also comprise means for receiving, from the wireless terminal, information that the wireless terminal is capable of updating UL transmission timing for cells in the TA group even when the TA timer for the associated TA group is not running.

The means for making a selection between plural updating modes may comprise a selection unit.

In one example embodiment, the means for making a selection between plural updating modes comprises a Medium Access Control, MAC, entity or a Radio Resource Control, RRC, entity.

The above-mentioned cells in the TA group may be serving cells in the TA group.

In yet another aspect of the technology, there is provided a method of operating a network node, the method comprising: communicating information over a radio interface with a wireless terminal; and making a selection between plural different updating modes for use by the wireless terminal for updating the uplink, UL, transmission timing for cells in a timing advance, TA, group, wherein the different modes comprises respective different ways of updating the UL transmission timing for the cells in a TA group even when a TA timer for the associated TA group is not running.

The method may further comprise: transmitting, to the wireless terminal, information related to the selected mode for use for updating the UL transmission timing for cells in the TA group.

For example, the selection can be made between the following updating modes for use by the wireless terminal:

i) updating the UL transmission timing for the cells in the TA group to be a downlink, DL, reception timing of that TA group offset by a offset quantity; ii) updating the UL transmission timing for the cells in the TA group to be a downlink, DL, reception timing of that TA group offset by a sum of a timing advance reference value ($N_{TA\_Ref}$) and a timing advance offset value ($N_{TA\_offset}$); iii) updating the UL transmission timing for the cells in the TA group to be a DL reception timing of that TA group offset by a currently used timing advance value ($N_{TA}$); iv) updating UL transmission timing for cells in a TA group by performing autonomous UL timing adjustment to follow the DL cell transmission timing in each TA group when the TA timer is not running even if there is no UL transmission on concerned serving cells.

The selection between plural different updating modes for use by the wireless terminal may, e.g., be based on one or more of the following criteria: Residual transmission timing error after UL transmission timing adjustment; Current UL transmission error; Frequent and/or large DL timing drifting; Criticality of data or services; Radio environment or radio channel characteristics.

The method may further comprise: receiving, from the wireless terminal, information that the wireless terminal is capable of updating UL transmission timing for cells in the TA group even when the TA timer for the associated TA group is not running.

The above-mentioned cells in the TA group may be serving cells in the TA group.

According to a further aspect of technology, there is provided a wireless terminal comprising: a communications interface configured to receive a timing advance command control element over a radio interface from a network node; and an uplink, UL, transmission timing update unit configured to update UL transmission timing for serving cells in a timing advance, TA, group even when a TA timer for the associated TA group is not running, wherein the transmission timing update unit is further configured to update UL transmission timing for the serving cells in the TA group by performing autonomous UL timing adjustment to follow the DL cell transmission timing in each TA group when the TA timer is not running even if there is no UL transmission on the serving cells belonging to the same TA group.

In an example embodiment, the wireless terminal is required to follow the change in the frame transmit timing of the serving cell and correspondingly adjust its transmit timing for each transmission.

According to yet another aspect of technology, there is provided a method of operating a wireless terminal. The method comprises: receiving a timing advance a timing advance command control element over a radio interface from a network node; and updating uplink, UL, transmission timing for serving cells in a timing advance, TA, group even when a TA timer for the associated TA group is not running; wherein the updating further comprises updating (S140) UL transmission timing for the serving cells in the TA group by performing autonomous UL timing adjustment to follow the DL cell transmission timing in each TA group when the TA timer is not running even if there is no UL transmission on the cells belonging to the same TA group.

The method may also comprise following the change in the frame transmit timing of the serving cell and correspondingly adjusting the transmit timing for each transmission.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
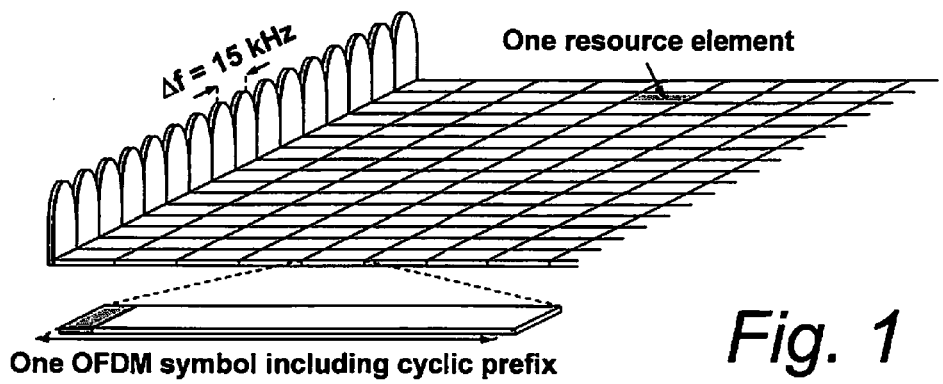
FIG. 1 is a diagrammatic view of an LTE downlink physical resource.
Figure 2:
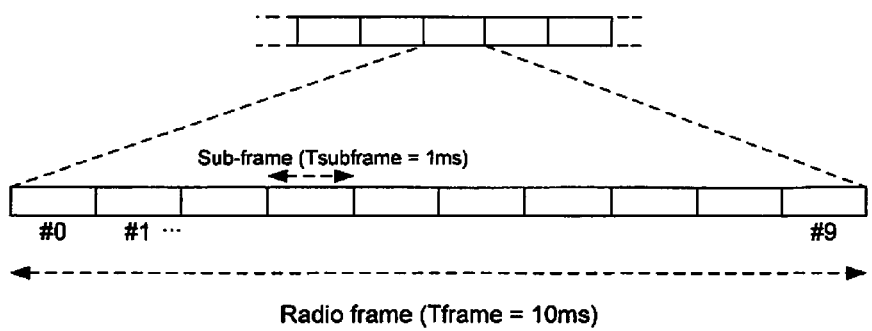
FIG. 2 is a diagrammatic view of an LTE time-domain structure.
Figure 4:
FIG. 4 is a diagrammatic view illustrating carrier aggregation.
Figure 3:
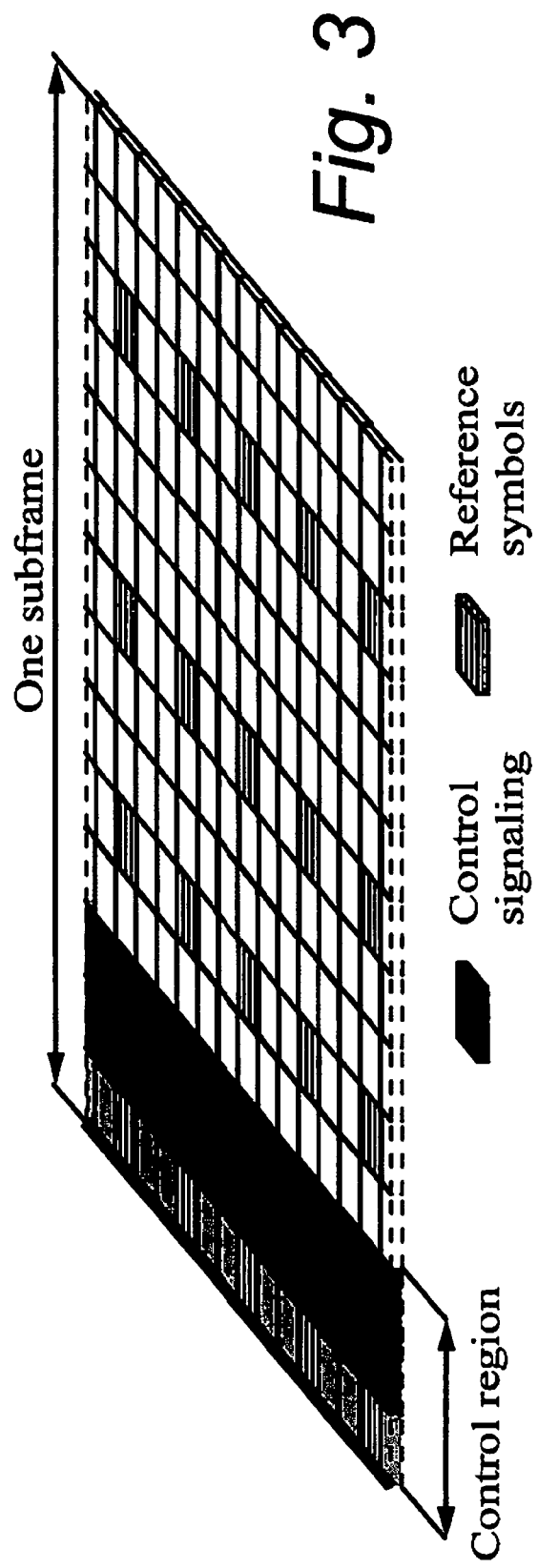
FIG. 3 is a diagrammatic view of a downlink subframe.
Figure 5:
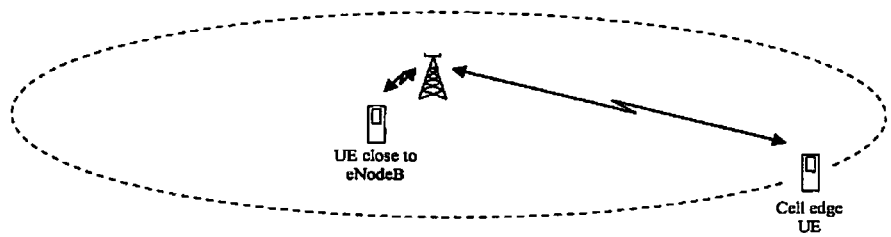
FIG. 5 is a diagrammatic view illustrating a cell with two UEs at different distance from an eNodeB.
Figure 6:
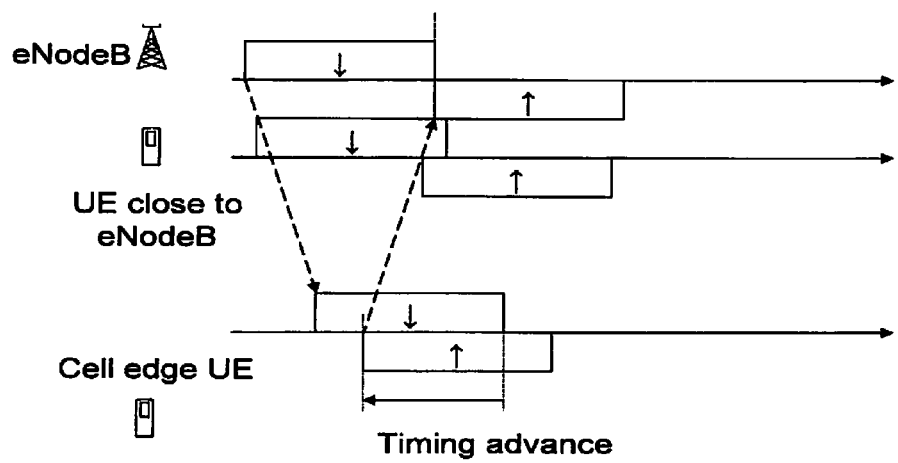
FIG. 6 is a diagrammatic view illustrating timing advance of UL transmissions depending on distance to eNodeB.
Figure 7:
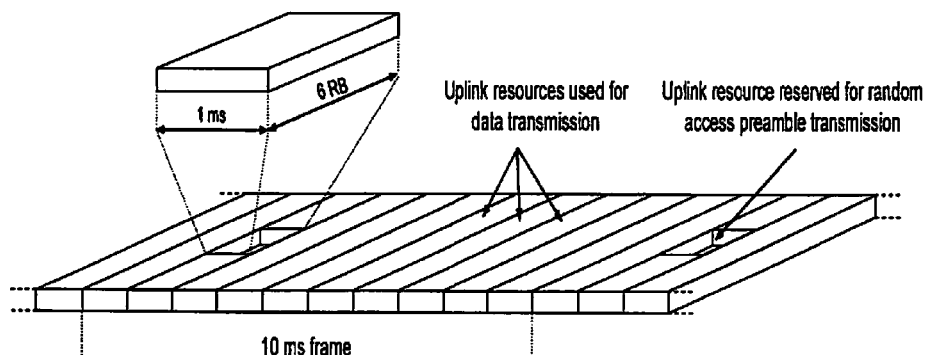
FIG. 7 is a diagrammatic view illustrating random-access-preamble transmission.
Figure 8:
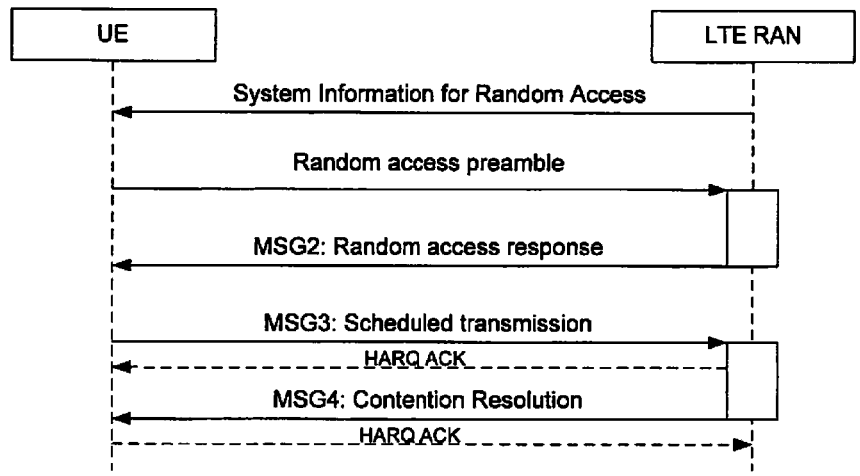
FIG. 8 is a diagrammatic view illustrating signaling over the air interface for a contention-based random access procedure in LTE.
Figure 9:
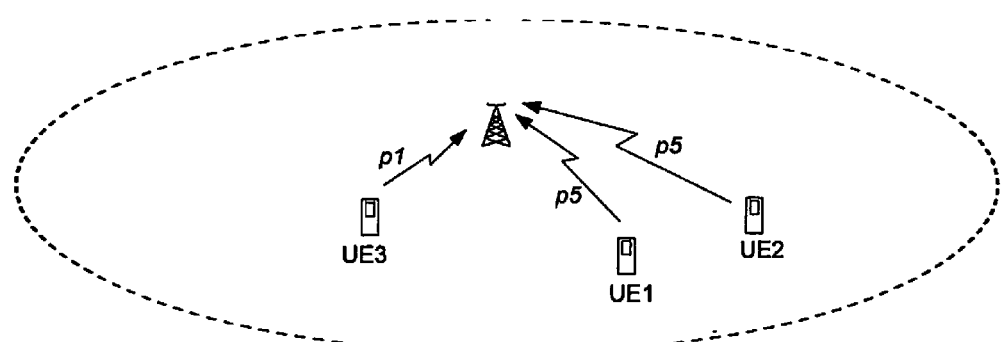
FIG. 9 is a diagrammatic view illustrating contention based random access, where there is contention between two UEs.
Figure 10:
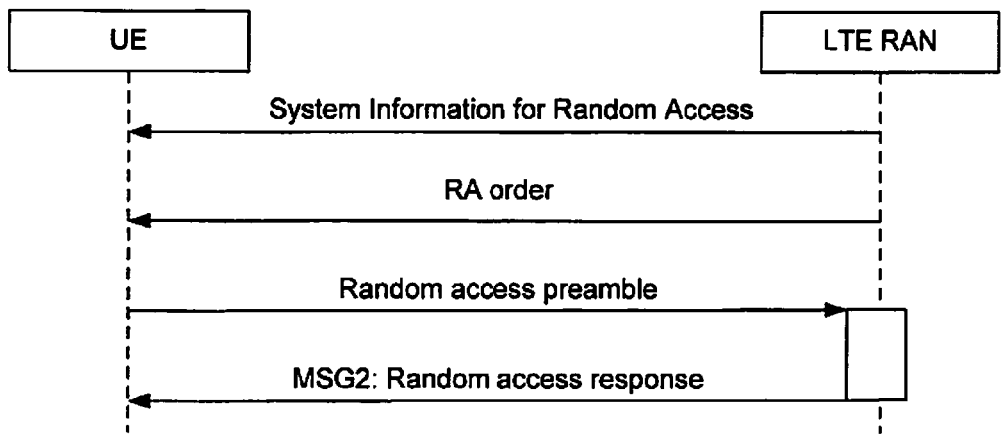
FIG. 10 is a diagrammatic view illustrating signaling over the air interface for the contention-free random access procedure in LTE.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network.

As used herein, the term "node" may encompass nodes using any technology including, e.g., high speed packet access (HSPA), long term evolution (LTE), code division multiple access (CDMA)2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

As understood from the foregoing, historically a UE does not perform UL transmission timing adjustment when there are no UL transmissions. That is, historically a UE does not perform UL transmission timing adjustment of the serving cells in a TAG when there are no UL transmissions in the serving cells in that TAG. The UL transmissions on a serving cell are prohibited when the TA timer associated with that serving cells TA group is not running Consequently, UL transmission timing adjustments on a serving cell are not performed when the TA timer associated with that cell's TA group is not running.

To enable the UE to get back into UL synchronization on serving cells belonging to a TA group when TA timer is expired, until now the eNB has had essentially two alternatives.

In one alternative the eNB orders the UE to perform a random access procedure so as to get a new initial TA value. For example, the eNB may order the UE to perform a random access procedure by sending an order or command such as that described in 3GPP TS 36.321, V10.5.0 (2012-03) 3rd Generation Partnership Project; Technical Specification Group Radio Access Network; Evolved Universal Terrestrial Radio Access (E-UTRA); Medium Access Control (MAC) protocol specification (Release 10), and particularly described in §5.1.1 The initial TA value is sent as part of the random access response message (as described, e.g., in 3GPP TS 36.321, V10.5.0 (2012-03), §5.1.4).

The other alternative (the "latter alternative") is for the eNB to send a timing advance command (TAC) [TAC MAC CE] to the UE in order to get the UE back into the into UL synchronization on the serving cells. The TAC MAC CE is addressed to these corresponding serving cells' TA group(s). The TAC MAC CE is defined in 3GPP TS 36.321, V10.5.0 (2012-03), §6.1.3.5. In the 3GPP TS 36.321, V10.5.0 (2012-03) two R-bits in the TAC MAC CE are used to address TA groups (TAG). The TAC MAC CE includes this TA group indicator (2 bits) and the TAC itself (6 bits). The TAG indicator tells the UE which TAG's TA value should be updated and the TAC tells the UE how the TA value should be updated.

In the latter alternative (which, e.g., utilizes the TAC MAC CE), the UE will, upon reception of a TAC MAC CE, adjust the UL transmission timing according to the TAC and start the associated TA timer. The latter alternative can be utilized when the eNB has judged that the UE has not moved since the last TAC MAC CE has been transmitted to it and hence the TA value(s) maintained by the UE is expected to be still valid.

There are various ways in which the eNB may determine that the UE has not moved since the last TAC MAC CE was transmitted to it. For example, the eNB may monitor the UE speed by measuring Doppler shift, measure the history of the TA values used by the UE (if TA value updates has never been needed for this UE, chances are that the UE is stationary or moving very slow) or look at angle-of-arrival of the UEs signal. Also the eNB can use positioning methods, such as GPS positioning or similar, to see if a UE has, or has not, moved far since the TA timer expired, and hence the TA value is expected to be correct.

If the DL reception timing has drifted while the TA timer has not been running, the following also occur: (1) the UE will not have performed UL transmission timing adjustments; and hence (2) the $N_{TA\_Ref}$ would have drifted from the actual UL transmission timing; and (3) the UL transmission timing will therefore contain an error. If the UE would receive a TAC MAC CE it would update UL transmission timing and set the $N_{TA\_Ref}+N_{TA\_offset}$ to this new UL transmission timing and the error due to DL timing drift will propagate making the updated UL transmission timing faulty. This in turn will degrade the performance of the uplink reception of UE signals at the eNB.

Figure 11:
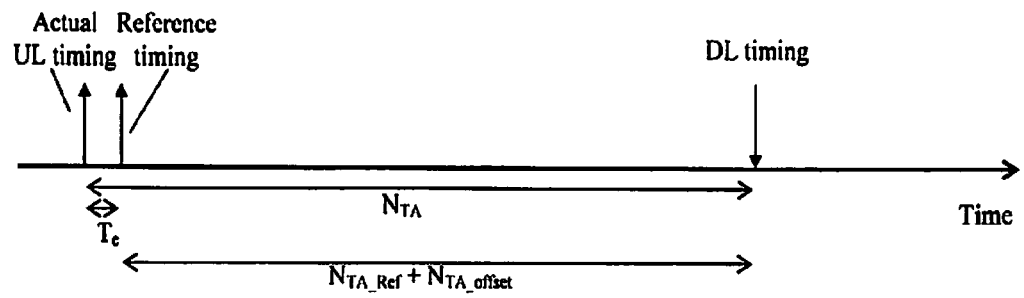
FIG. 11-FIG. 13 are diagrammatic views of problem situations which may be encountered due to DL reception timing drift while a TA timer has not been running.
Figure 12:
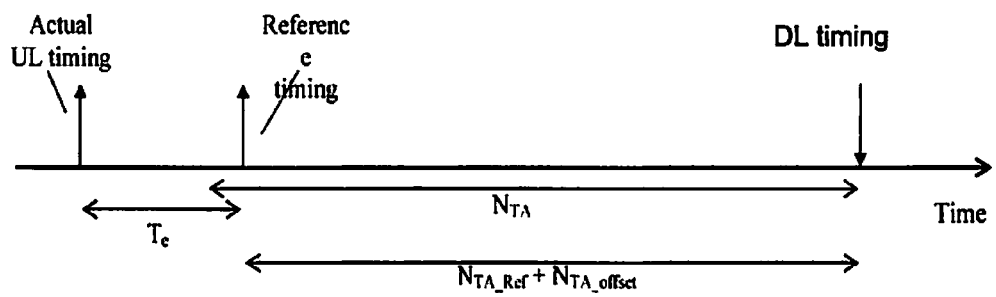
Figure 13:
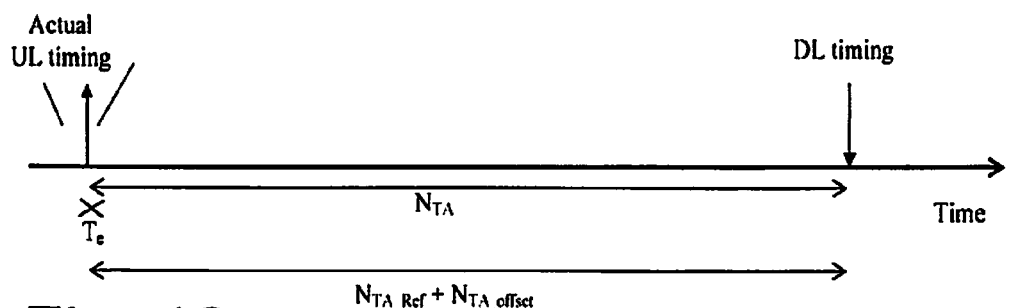

An example of the above problem or situation is illustrated in FIG. 11, FIG. 12, and FIG. 13. FIG. 11 shows a state in the UE at time t1. The difference between the reference timing and the actual UL timing, $T_e$ (also known as "transmission timing error"), for a serving cell is small. At a time t2 the TA timer for that serving cell expires and, when expired, the UE will not perform any autonomous UL transmit timing adjustments. At a time t3, illustrated in FIG. 12, the DL timing has drifted and hence the reference timing for that cell has drifted and therefore $T_e$ has increased. Even if $T_e$ might have increased beyond the threshold of when autonomous UL transmission timing adjustment should be performed by the UE, it will not be performed by the UE as the TA timer has expired which prohibits UL timing adjustments. At a time t4, which could be minutes after t2, the eNB wants the UE to resume UL transmissions on that cell and the eNB judges that the UE has not moved far since the last TAC MAC CE and eNB therefore sends a TAC MAC CE with the value zero to the UE expecting it to use the previously used $N_{TA}$. Upon reception of the TAC MAC CE the UE will update actual UL timing with zero and the reference timing will be updated to this timing, as seen in FIG. 13. However, even though the eNB sent a TAC MAC CE with value zero the $N_{TA\_Ref}$ will change and the error due to the drift will be added to the $N_{TA\_Ref}$. As illustrated in FIG. 13, the UE has received a TAC MAC CE which will update the UL transmission timing and the timing reference will be updated to be that new timing. As the UE has not performed UL timing adjustments during the time the TA timer has not been running the DL timing drift during that time will introduce an error which will aggregate to the new timing.

5.0 General Structure and Operation

The technology disclosed herein provides various embodiments and modes of different methods for reducing or completely removing the error in UL transmission timing due to DL reception timing drift during TA timer expiry. These example embodiments eliminate or minimize the UL transmission errors. At least some of these example embodiments comprise pre-defined rules and/or a combination of network-controlled signaling.

Figure 17:
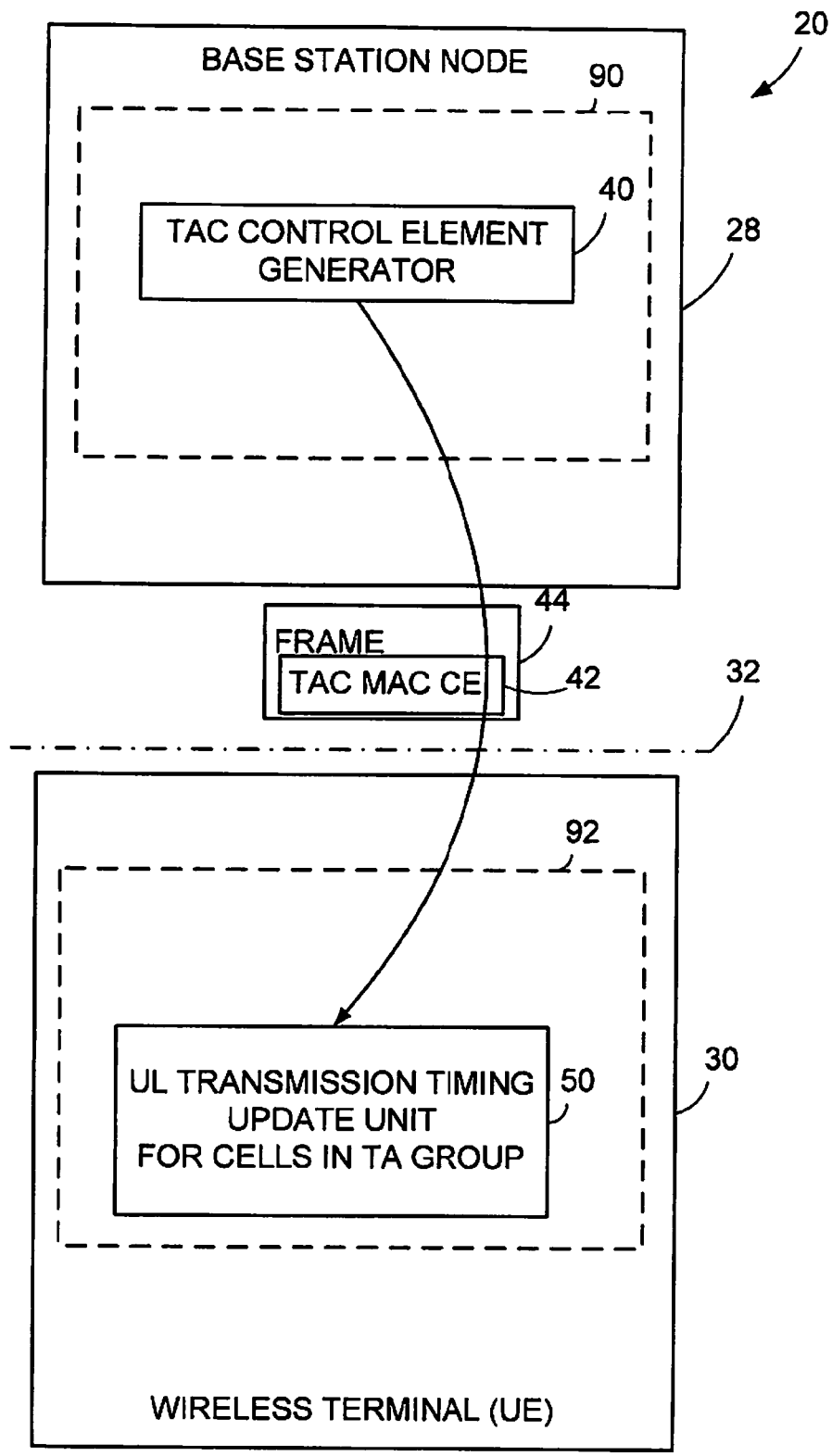
FIG. 17 is a schematic view of an example radio communications network according to an example embodiment of the technology disclosed herein.

FIG. 17 shows an example radio communications network 20 comprising a node 28 and at least one wireless terminal (UE) 30 which communicate over an air or radio interface 32. The base station node 28 includes a TAC control element (TAC MAC CE) generator 40 which generates a TAC control element (TAC MAC CE 42) for inclusion in a signal (e.g., a frame 44) which is transmitted over the radio interface 32 to the wireless terminal (UE) 30. As mentioned above, the TAC MAC CE is defined in 3GPP TS 36.321, V10.5.0 (2012-03), §6.1.3.5. As further shown in FIG. 17, the TAC control element 42 is used by UL transmission timing update unit 50. The UL transmission timing update unit 50 serves to update the UL transmission timing for cells in a TA group and does so even when the TA timer for the associated TA group is not running.

Figure 18:
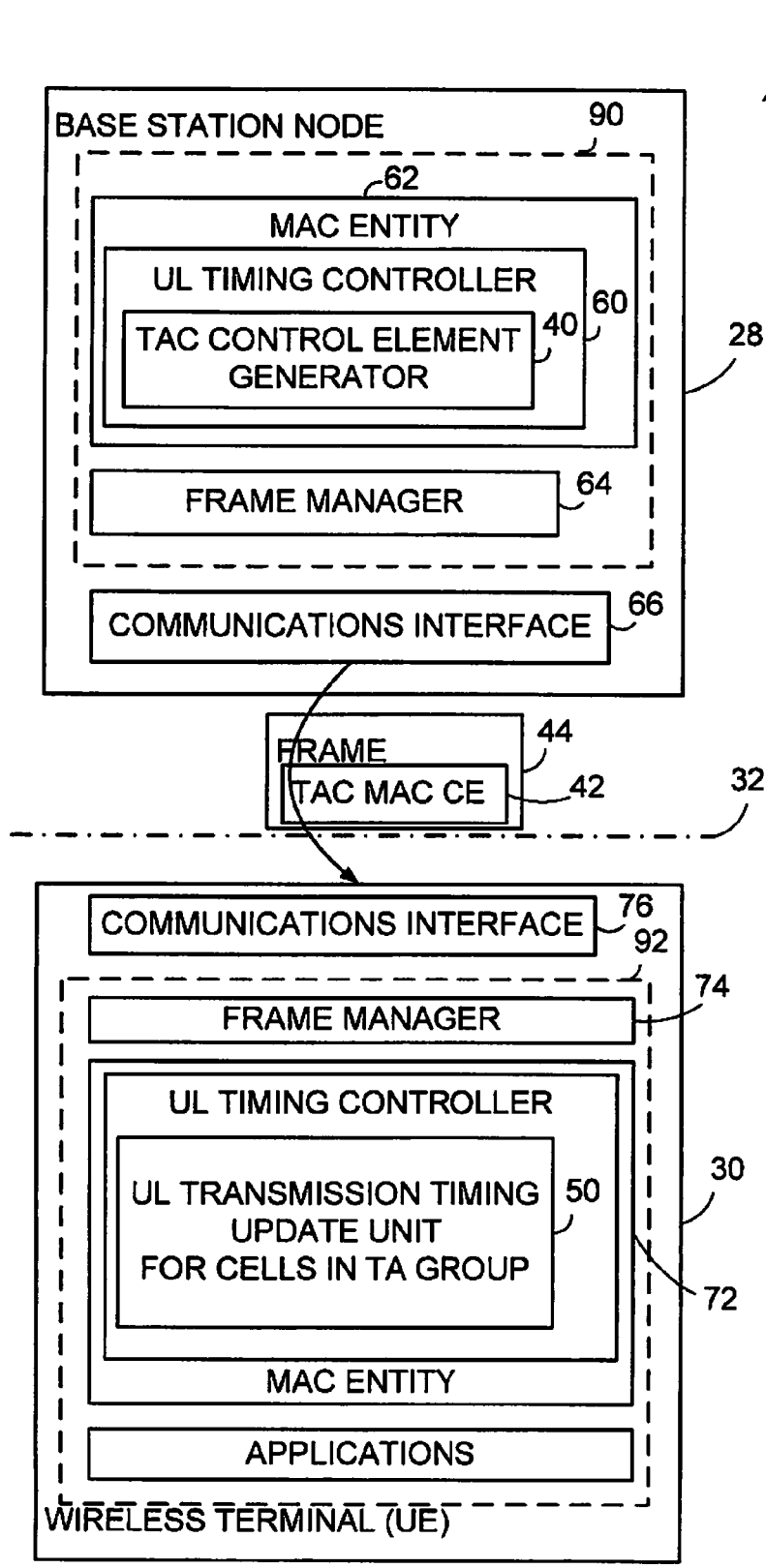
FIG. 18 is a schematic and more detailed view of an example radio communications network according to an example implementation of an example embodiment of the technology disclosed herein.

FIG. 18 illustrates further details of the node 28 and the wireless terminal (UE) 30 according to an example, non-limiting embodiment. FIG. 18 shows that the TAC control element generator 40 of node 28 may comprise or form at least part of UL timing controller 60, which in turn may comprise or form part of a Medium Access Control (MAC) entity 62. The TAC control element (TAC MAC CE 42) which is generated by TAC control element generator 40 is included in frame 44 by a frame handler or frame manager 64. The frame manager 64 may serve not only to prepare or format the frame 44 for downlink (DL) transmission over the radio interface 32, but also to unpack or process of the frame which is transmitted from the wireless terminal (UE) 30 to the node 28 on the uplink (UL). The frame 44 is transmitted by node 28 over the radio interface 32 through a communications interface 66. The communications interface 66 typically comprises plural antenna elements and associated electronics for transmission of frame resource elements on the downlink (DL), and also typically for reception of frame resource elements on the uplink (UL).

The UL transmission timing update unit 50 of wireless terminal (UE) 30 may also comprise or form at least part of a UE uplink (UL) timing controller 70. Similar to that of the node 28, the UE uplink (UL) timing controller 70 may comprise or form a portion of UE Medium Access Control (MAC) entity 72. The TAC control element (TAC MAC CE 42) is obtained by the wireless terminal (UE) 30 from the frame 44 by UE frame manager 74. The UE frame manager 74 not only processes the downlink (DL) resource elements of the TAC control element generator 40 received over the radio interface 32, but also prepares or formats the uplink (UL) resource elements for transmission over radio interface 32. The frame 44 is received by wireless terminal (UE) 30 over the radio interface 32 by communications interface 76. The communications interface 76 typically comprises plural antenna elements and associated electronics for reception of frame resource elements on the downlink (DL), and also typically for transmission of frame resource elements on the uplink (UL).

In example embodiments and modes and as depicted by way of example in FIG. 17 and FIG. 18 and other figures, the TAC control element generator 40 of the node 28 and the UL transmission timing update unit 50 of wireless terminal (UE) 30 may be realized by a machine platform. Indeed, the Medium Access Control (MAC) entity 62 and UE Medium Access Control (MAC) entity 72 and other elements of the node 28 and wireless terminal (UE) 30, such as the frame handlers/frame managers, may be realized by a machine platform. To this end FIG. 17 and FIG. 18 employ a broken line to represent a machine platform 90 for the node 28 and a broken line to represent a machine platform 92 for the wireless terminal (UE) 30, the respective machine platforms essentially comprising the aforementioned respective units. The terminology "machine platform" is a way of describing how at least some of the functional units of node 28 and wireless terminal (UE) 30 may be implemented or realized by machine. The machine platforms 90 and 92 may take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform 90 may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable is that of a hardware circuit, e.g., an application specific integrated circuit (ASIC) wherein circuit elements are structured and operated to perform the various acts described herein.

Thus, in view of the foregoing, the UL transmission timing update unit 50 may be implemented, and accordingly referenced or described, as a controller, as means for performing the UL transmission timing update, among other appellations understood from the foregoing.

The UL transmission timing update units of the technology disclosed herein, such as UL transmission timing update unit 50 of FIG. 17 and FIG. 18, serve to update the UL transmission timing for the serving cells in a TA group. In particular, using the technology disclosed herein, the UE changes the UL transmission timing of the cells in a TA group according to the TA value associated with that TA group. Then, when resuming uplink transmission on the cells in that TA group, the UE uses the correct TA value for those cells.

Figure 19:
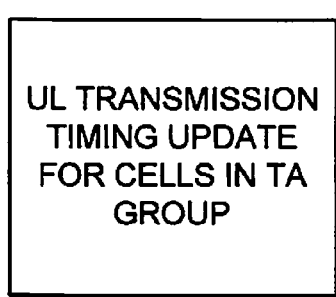
FIG. 19 is a diagrammatic view depicting various different embodiments or modes of adjusting or performing UL transmission timing adjustment when there are no UL transmissions.

The UL transmission timing update units of the technology disclosed herein may be configured according to various embodiments/modes and thus operate in various modes or methods. Three example embodiments or modes are generally depicted in FIG. 19. In an first example embodiment and mode the UL transmission timing update unit 50 updates the UE UL transmission timing for the serving cells in a TA group to be a DL reception timing of that TA group offset by a sum of a timing advance reference value ($N_{TA\_Ref}$) and a timing advance offset value ($N_{TA\_offset}$), e.g., by the sum $N_{TA\_Ref} + N_{TA\_offset}$. In a second example embodiment and mode the UL transmission timing update unit 50 updates the UE UL transmission timing for the serving cells in a TA group to be the DL reception timing of that TA group offset by a currently used timing advance value ($N_{TA}$). In a third example embodiment and mode the UL transmission timing update unit 50 autonomously updates or adjusts its UL timing adjustment to follow the DL cell transmission timing in each TA group when the TA timer is not running even if there is no UL transmission on the concerned serving cells.

Figure 23:
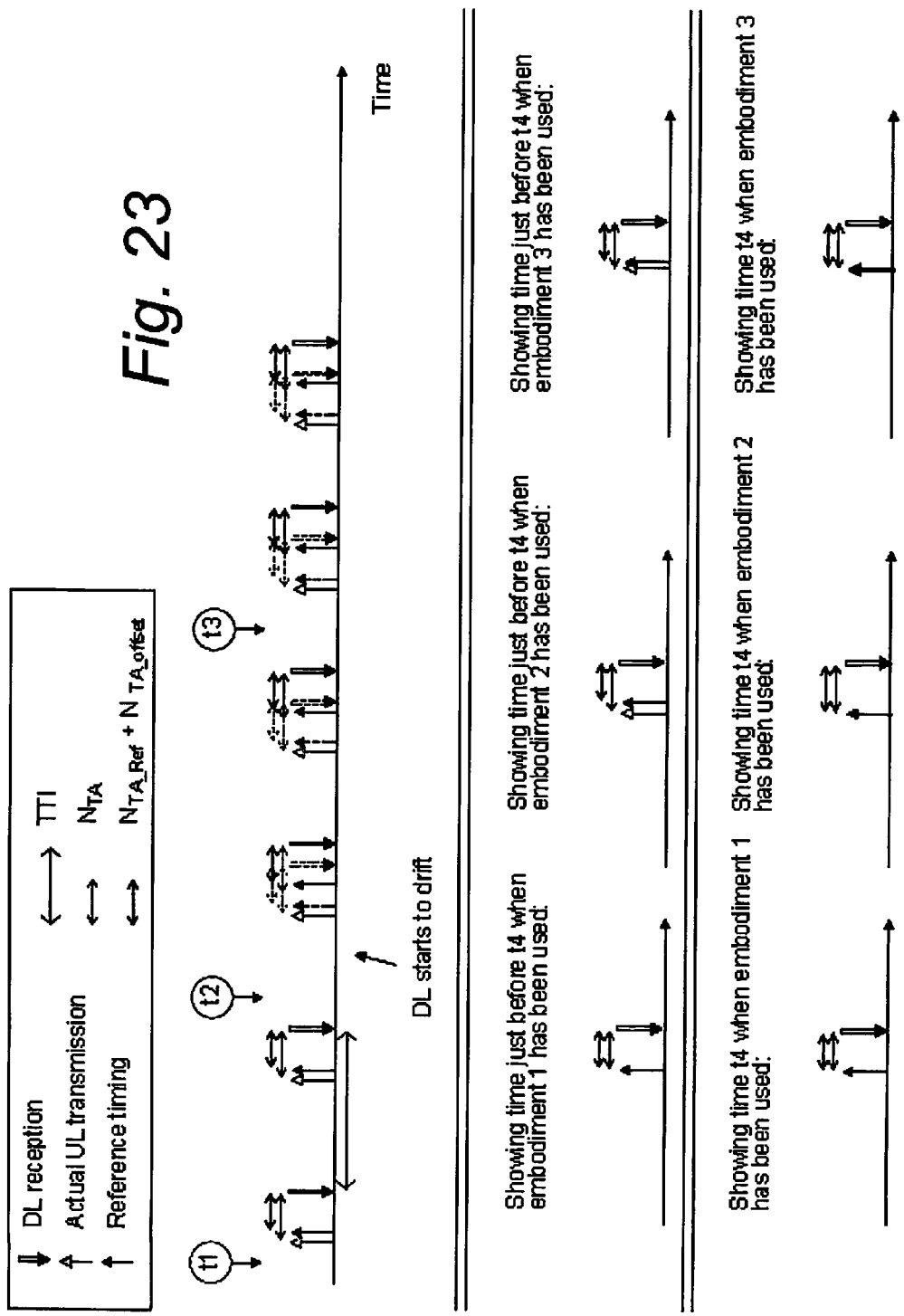
FIG. 23 comprises schematic views illustrating and contrasting the differing embodiments and modes of adjusting or performing UL transmission timing adjustment when there are no UL transmissions.

The three example embodiments or modes mentioned above and generally illustrated in FIG. 19 are also described in more detail below and both illustrated and contrasted by FIG. 23.

In an example embodiment, if more than one example embodiment or mode is specified, then the network node or the UE may select a method for UL timing adjustment based on received information from the network and/or pre-defined rule(s), which in turn are based on one or more selection criteria, as described in section 5.5 hereof.

5.1 First Example Embodiment/Mode: Timing Adjustment Based on $N_{TA\_Ref}$ and $N_{TA\_offset}$ In a first example embodiment or mode the wireless terminal (UE) 30 may, before applying a TAC MAC CE when the associated TA timer is not running, update the UL transmission timing for the serving cells belonging to that TA group to be the DL reception timing of that TA group offset by the offset quantity $N_{TA\_Ref}+N_{TA\_offset}$. The method of this first example embodiment is based on a pre-defined rule. The UE may also be required to meet one or more set of pre-defined requirements associated with this method. The requirements may be expressed in terms of residual transmit timing error (e.g. ±2 Ts) after applying this rule. The pre-defined requirements associated with this method may also depend upon the bandwidth of the cells in the TA group (TAG) or bandwidth (BW) of the timing reference cell in the TAG.

Figure 14:
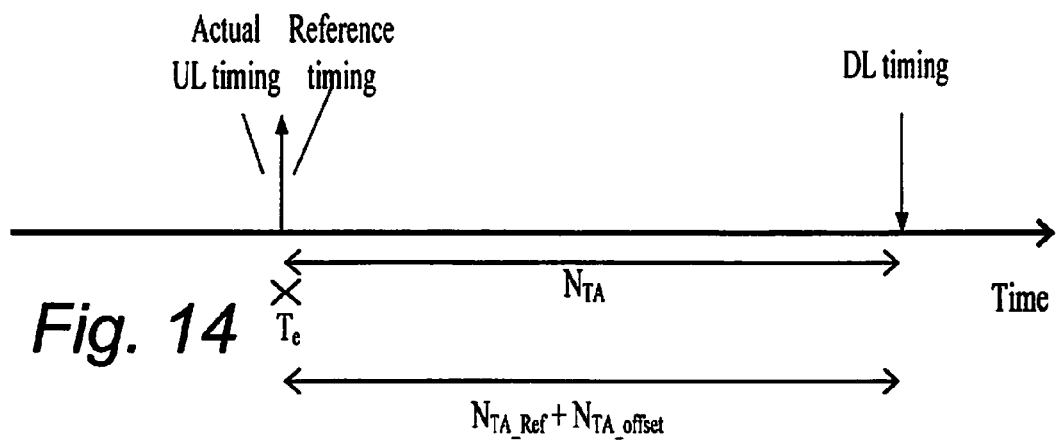
FIG. 14 is a diagrammatic view of a first example embodiment or mode of adjusting or performing UL transmission timing adjustment when there are no UL transmissions.

When using the method of this first example embodiment, the actual UL timing used by the UE after applying the TAC MAC CE on those serving cells does not contain an error, e.g., $T_e$ will be zero or negligible (e.g. not more than +2 Ts), as illustrated in FIG. 14. FIG. 14 shows e.g., a time just before an alternative time t4 where the first example embodiment has been applied. The UE has adjusted the actual UL timing to be the DL timing offset by $N_{TA\_Ref}+N_{TA\_offset}$ (i.e. the reference timing). At the following time t4 the UE will apply the TAC MAC CE to update the actual UL timing and the reference timing will be set to this updated actual UL timing. The UL transmission timing will at time t4 not contain an error due to DL timing drift.

5.2 Second Example Embodiment/Mode: Timing Adjustment Based on $N_{TA}$

In the second example embodiment or mode the UE will, before applying a TAC MAC CE to a TA value when the associated TA timer is not running, update the UL transmission timing for the serving cells belonging to that TA group to be the DL reception timing of that TA group offset by the offset quantity $N_{TA}$. The method of this second example embodiment is also based on a pre-defined rule. The UE may also be required to meet one or more set of pre-defined requirements associated with this method. The requirements may be expressed in terms of residual transmit timing error (e.g. $T_e$ is not more than ±10 Ts) after applying this rule. The pre-defined requirements associated with this method may also depend upon the bandwidth of the cells in the TA group (TAG) or bandwidth (BW) of the timing reference cell in the TAG.

Figure 15:
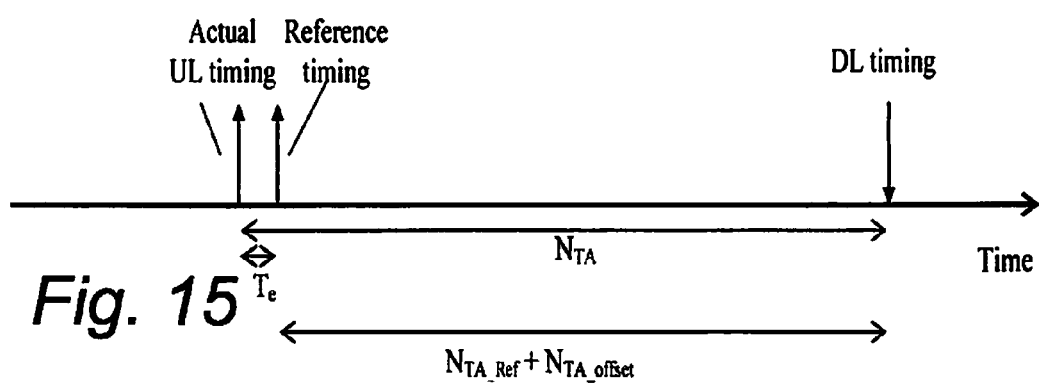
FIG. 15 is a diagrammatic view of a second example embodiment or mode of adjusting or performing UL transmission timing adjustment when there are no UL transmissions.

When using the method of this second example embodiment, the actual UL timing used by the UE after applying the TAC MAC CE on those serving cells will contain an error equally large as prior to the TA timer expiry, i.e. $T_e$ will be the same as before TA timer expiry, as illustrated in FIG. 15. FIG. 15 shows, e.g., a time just before an alternative time t4 where the method of the second example embodiment has been applied. The UE has adjusted the actual UL timing to be the DL timing offset by $N_{TA}$. At the following time t4 the UE will apply the TAC MAC CE to update the actual UL timing and the reference timing will be set to this updated actual UL timing. The UL transmission timing will at time t4 contain an error equally large as prior to TA timer expiry regardless of the DL timing drift.

5.3 Third Example Embodiment/Mode: Timing Adjustment in the Absence of UL Transmission In a third example embodiment or mode the UE will perform autonomous UL timing adjustment to follow the DL cell transmission timing in each TA group when the TA timer is not running even if there is no UL transmission on the concerned serving cells. This means the UE will adjust its UL timing in both cases, i.e., when there is an UL transmission and no UL transmission. The procedure of this third example embodiment requires the UE to keep its transmitter active to some extent (able to perform the UL transmission adjustments described herein) even when not transmitting in the uplink. In this regard, the transmitter can be "active" without transmitting, e.g., the transmitter's radio frequency (RF) components remain ON and the transmitter is able to adjust its actual UL timing (e.g., UL timing parameters) without necessarily transmitting. When the transmitter is inactive, by contrast, the RF components (e.g., power amplifier) can be shut down and thus may need some time, e.g. at least few hundred's of μ-seconds, to start transmission (possibly resulting in loss of one or more slots or even a subframe).

An advantage is that when the UE resumes the uplink transmission, its uplink timing will result in less error compared to the existing solution where the UE does not do any adjustment. The basic principle is based on a pre-defined rule. However certain parameters used by the UE can be pre-defined and/or signaled by the network as described below.

The parameters and their values associated with the rate (also known as the "slew rate") at which the UE performs UL timing adjustments in the absence of UL transmission may be pre-defined and/or signaled by the network. In case of being signaled by the network, the parameters may be generated and/or sent by the serving network node, e.g., the eNB, and by units or functionalities thereof such as the Radio Resource Control (RRC) or Medium Access Control (MAC), and signaled using either the RRC and/or MAC protocols. These parameters may also be predefined (e.g., set by specification), in which case the wireless terminal (UE) 30 may be hard-coded with the values. Different parameter values may be applicable for different situations. Another alternative is that the wireless terminal (UE) 30 determines these values by some parameters, e.g. channel quality etc. etc. These parameters (e.g., "slew rate parameters") and their values may be the same or different compared to those used by the UE for adjusting its UL timing when there is an UL transmission. This rule can be pre-defined or indicated by the network, e.g., whether the UE should use the same parameters or not.

The nature and type of slew rate parameters with which the UE adjusts its timing are known to or understandable by the person skilled in the art. When implementing this third example embodiment, the UE may use the same type of slew parameters (albeit perhaps with different values) for specifying the extent to which the UE keeps its transmitter active when not transmitting in the uplink. Such general types of slew rate parameters include (but are not limited to) the following, or take the following into consideration:

The maximum amount of the magnitude of the uplink timing change in one adjustment step is T1 e.g. 100 ns The minimum aggregate uplink timing adjustment rate is T2 over certain of time e.g. 300 ns per second.

The maximum aggregate uplink timing adjustment rate is T3 over certain period of time e.g. 1 μs per 200 ms.

Furthermore the above stated parameters (maximum or aggregated, minimum or maximum, adjustment steps over their respective time periods) may also depend upon one or more of the following factors:

Maximum bandwidth transmitted signals (e.g. CRS signals) of:
  All or group of serving cells in a TA group, e.g., downlink cell transmission bandwidth and/or uplink transmission bandwidth, or
  Timing reference cell in a TA group, e.g., downlink cell transmission bandwidth and/or uplink transmission bandwidth.
Type of carrier aggregation scheme e.g. intra-band contiguous CA, intra-band non-contiguous CA, inter-band CA, etc.
UE activity factor e.g. whether UE is in non-DRX or in DRX, DRX length in case it is in DRX, whether it is in DTX or not, DTX length in case it is in DTX etc.
Type of physical channel e.g. UL data channel such as PUSCH, UL control channel such as PUCCH etc.
Whether cells involved in CA or COMP are co-located or not.
Radio characteristics e.g. user speed, radio environment such as with larger delay spread, deployment scenario such as urban etc.

Similarly, the minimum $T_e$ required to perform the adjustments (i.e. $T_e$ which triggers the UE to initiate adjustment) may also be predefined and/or be signaled by the network. The $T_e$ value may also depend upon additional factors, e.g., bandwidth of timing reference cell in a TA group, maximum bandwidth of a serving cell in a TA group, etc.

The UE may also be required to meet one or more set of pre-defined requirements associated with the method of this third example embodiment. The requirements may be expressed in terms of one or more parameters values which are to be met by the UE after applying this rule. For example they can be expressed in terms of residual transmit timing error (e.g. not worse than ±20 Ts), timing adjustment step accuracy (e.g. not worse than ±10 Ts), etc. The pre-defined requirements associated with the method of this third example embodiment may also depend upon one or more parameters listed above, e.g., bandwidth of the cells in the TA group (TAG), BW of the timing reference cell in the TAG, type of carrier aggregation, etc.

Figure 16:
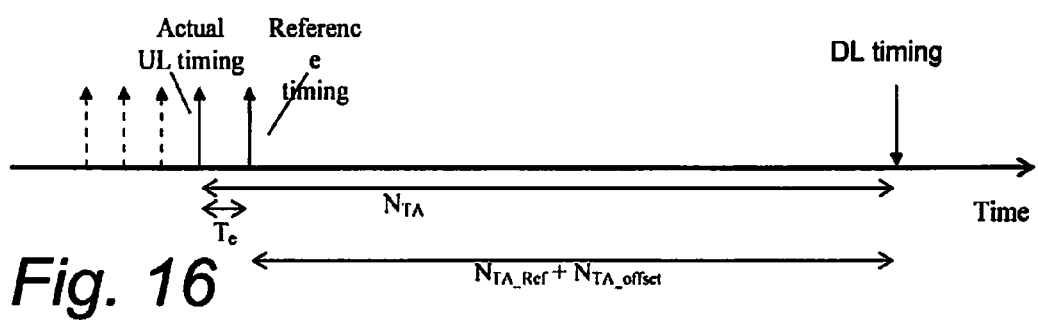
FIG. 16 is a diagrammatic view of a third example embodiment or mode of adjusting or performing UL transmission timing adjustment when there are no UL transmissions.

If the DL timing drifts, the UE would, according to this third example embodiment, adjust the actual UL timing to reduce the error in a manner such as that illustrated in FIG. 16. FIG. 16 shows e.g., a time just before an alternative time t4 where the third example embodiment has been applied. The actual UL timing has been incrementally adjusted during the time that the TA timer has been expired where the dashed lines shows the actual UL timings adjustments during the time when the TA timer was expired. At time following time t4 the UE will apply the TAC MAC CE to update the actual UL timing and the reference timing will be set to this updated actual UL timing. The UL transmission timing at time t4 will contain an error less than the threshold for Te.

Figure 24:
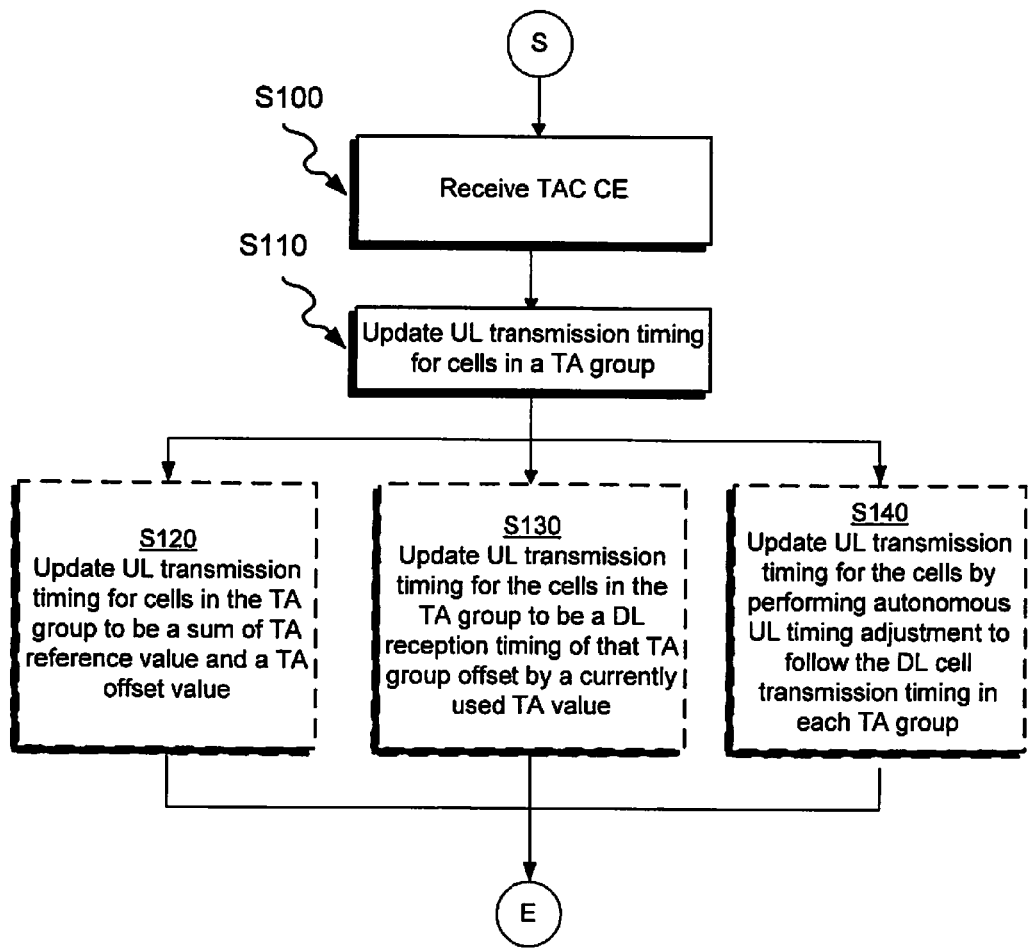
FIG. 24 is a flowchart illustrating methods according to various embodiments of the technology disclosed herein.

The above-mentioned three embodiments or modes are illustrated in FIG. 24 as well. These embodiments are implemented, or preformed, by a UE. The UE receives S100 a timing advance command (TAC) control element (CE) over a radio interface from a network node.

In a first example embodiment (which is also described above under 5.1), upon receipt of the TAC CE, UL transmission timing for cells in a TA group is updated S110 even when a TA timer for the associated TA group is not running According to this embodiment, he method also comprises updating S120 the UL transmission timing for the cells in the TA group to be a DL reception timing of that TA group offset by a sum of a timing advance reference value ($N_{TA\_Ref}$) and a timing advance offset value ($N_{TA\_offset}$).

In a second example embodiment (which is described under 5.2 hereinabove), upon receipt of the TAC CE, UL transmission timing for cells in a TA group is updated S110 even when a TA timer for the associated TA group is not running. In this embodiment, the method further comprises updating S130 the UL transmission timing for the cells in the TA group to be a DL reception timing of that TA group offset by a currently used timing advance value ($N_{TA}$).

In a third example embodiment (which is described in section 5.3), the method further comprises updating S140 UL transmission timing for cells in a TA group by performing autonomous UL timing adjustment to follow the DL cell transmission timing in each TA group when the TA timer is not running even if there is no UL transmission on concerned serving cells.

5.4 LIE Capability Reporting to Indicate Supported Timing Adjustment Method

Figure 20:
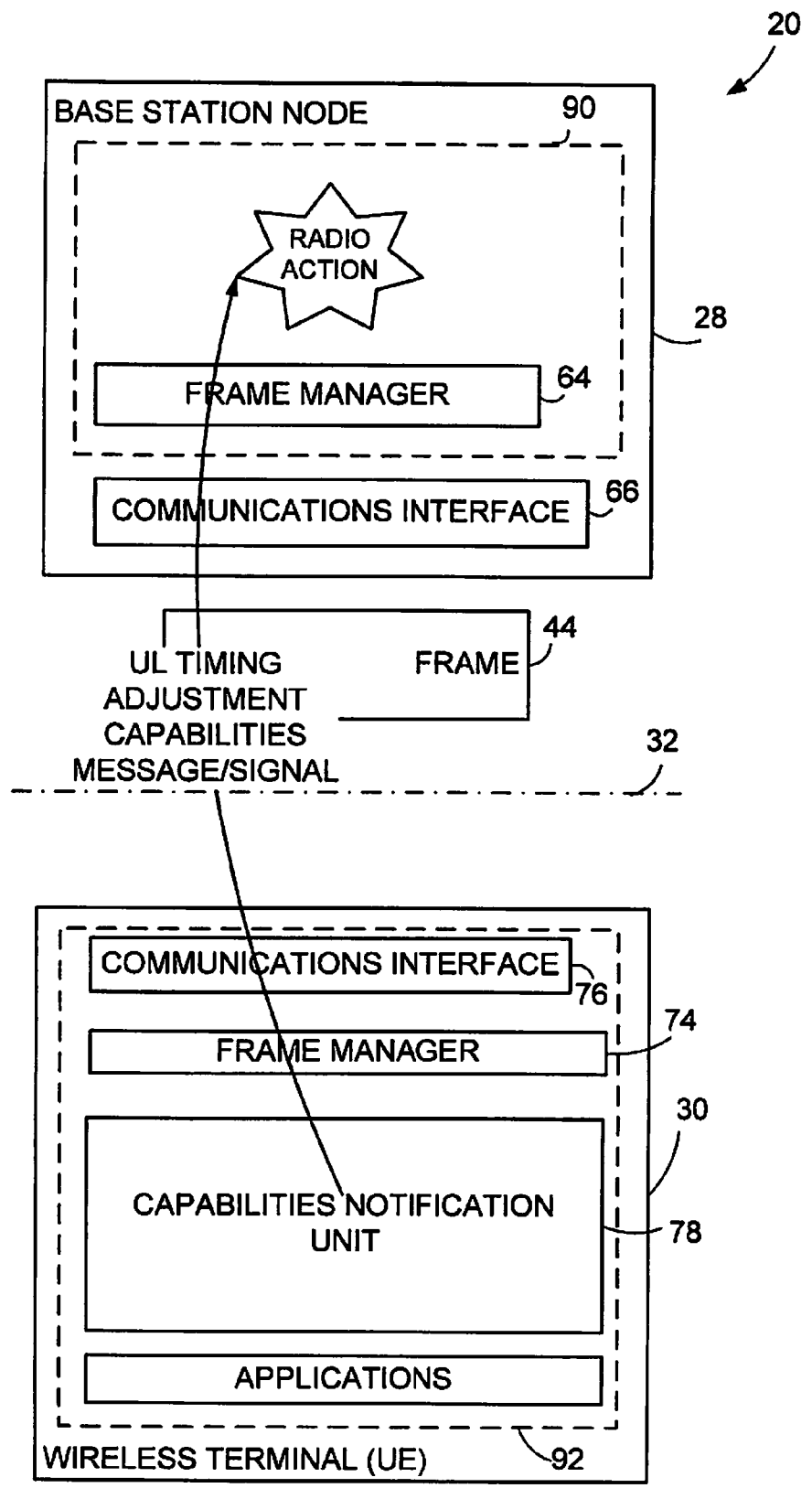
FIG. 20 is a schematic view of an example radio communications network according to an example embodiment wherein a wireless terminal generates and prepares a UL timing adjustment capabilities message/signal for transmission to a network node.

One or more UL timing adjustment embodiments or modes as described in previous sections (5.1-5.3), e.g., first through third example embodiments, may not be supported by all UEs. Thus, according to further aspect of the technology disclosed herein, the UE which supports such capability (i.e. methods/modes described in sections 5.1-5.3) may inform the network node (e.g. serving eNB) that it is capable of adjusting its timing according to one or more of the methods above. As shown in FIG. 20, the wireless terminal (UE) 30 may include a capabilities notification unit 78 which is configured to generate a message, signal, or other appropriate notification which appraises the node 28 that the wireless terminal (UE) 30 supports such capability. The capabilities notification unit 78 may comprise or form part of any appropriate other unit of wireless terminal (UE) 30, such as a RRC entity/controller or MAC entity/controller, for example. In one non-limiting example, the capabilities notification unit 78 is a RRC entity/controller whereby the wireless terminal (UE) 30 signals its capability using signaling protocol such as the RRC protocol. FIG. 20 shows an example wireless terminal (UE) 30 sending such an "UL Timing Adjustment Capabilities" message or signal to node 28 generated by capabilities notification unit 78 of wireless terminal (UE) 30 and included in an UL portion of frame 44 sent to node 28. The "UL Timing Adjustment Capabilities" message or signal may be included in an existing message or signal (e.g., a message or signal that also has use for other purposes) or may be a dedicated signal or message.

The signal or message that includes the reported capability may also comprise additional information. For instance the additional capability information may comprise frequency band indicators and/or CA scenarios (e.g., inter-band, intra-band, etc) for which its capability of the UL timing adjustment is supported. The capability information may also indicate whether the UE uses pre-defined parameters and/or needs to be configured with certain parameters (e.g., parameters as described in section 5.3 hereof).

The acquired capability information may also optionally be used by the serving network node for performing one or more radio operation tasks or actions, represented by a "radio action" symbol shown in FIG. 20. Examples of radio operation tasks include but are not limited to the following: (1) making a decision regarding which method to use for the UL timing adjustment when multiple TA groups are configured at the UE; (2) determining whether to send information or set of parameters to adjust the UE timing or use legacy procedures; (3) determining the information and parameters to be included when configuring UE with certain method, etc.

The UE may send the capability information to the network node in any of the following manners:

Proactive reporting without receiving any explicit request from the network node (e.g., serving or any target network node).

In the case of proactive reporting, the UE may report its capability during one or more of the following occasions:

During initial setup or call setup, e.g., when establishing the RRC connection.

During cell change e.g. handover, primary carrier change in multi-carrier operation, PCell change in multi-carrier operation, RRC re-establishment, RRC connection release with redirection, etc.

Reporting upon receiving any explicit request from the network node (e.g., serving or any target network node).

In the case of reporting upon receiving any explicit request, the explicit request can be sent to the UE by the network anytime or at any specific occasion. For example the request for the capability reporting can be sent to the UE during initial setup or after a cell change (e.g., handover, RRC connection re-establishment, RRC connection release with redirection, PCell change in CA, PCC change in PCC, etc).

5.5 Method of Selecting Method for UL Timing Adjustment and Indication Thereof

Figure 21:
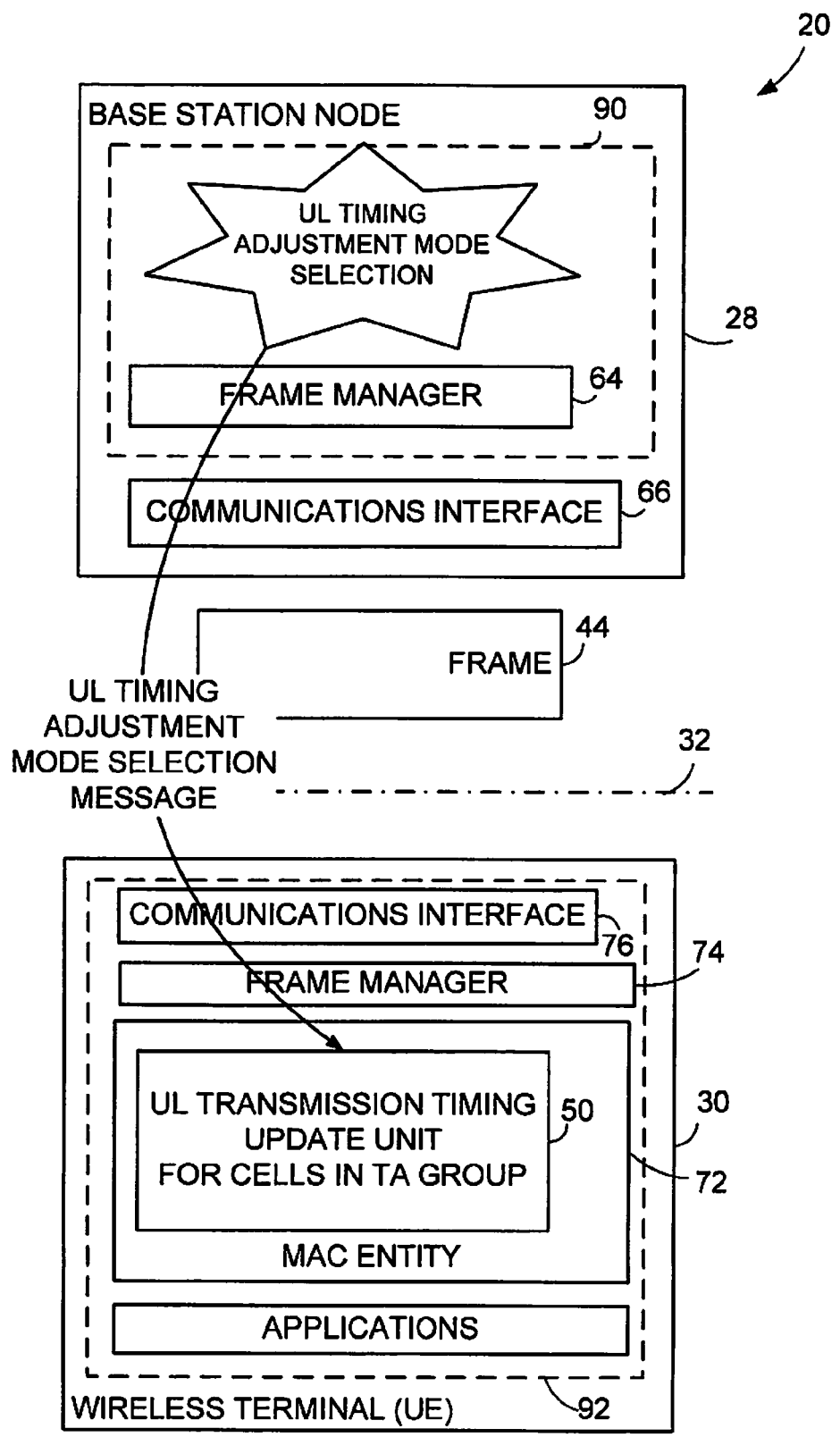
FIG. 21 is a schematic view of an example radio communications network according to an example embodiment wherein a network node makes a determination of a selected uplink (UL) timing adjustment mode and generates a UL timing adjustment mode selection message/signal for transmission to a wireless terminal.

According to this aspect of the technology disclosed herein, if more than one method for UL timing adjustment (e.g., more than one of the embodiments/modes of section 5.1-5.3 hereof) is specified, then the network node (e.g. eNB) may use one or more criteria to select the most appropriate method for UE UL timing adjustment when multiple TA groups are configured at the UE, in a manner illustrated by way of example in FIG. 21. Any appropriate unit or functionality in the node 28 may serve to make the selection. For example, such selection unit or functionality may comprise a MAC entity/controller or a RRC entity/controller.

Figure 22:
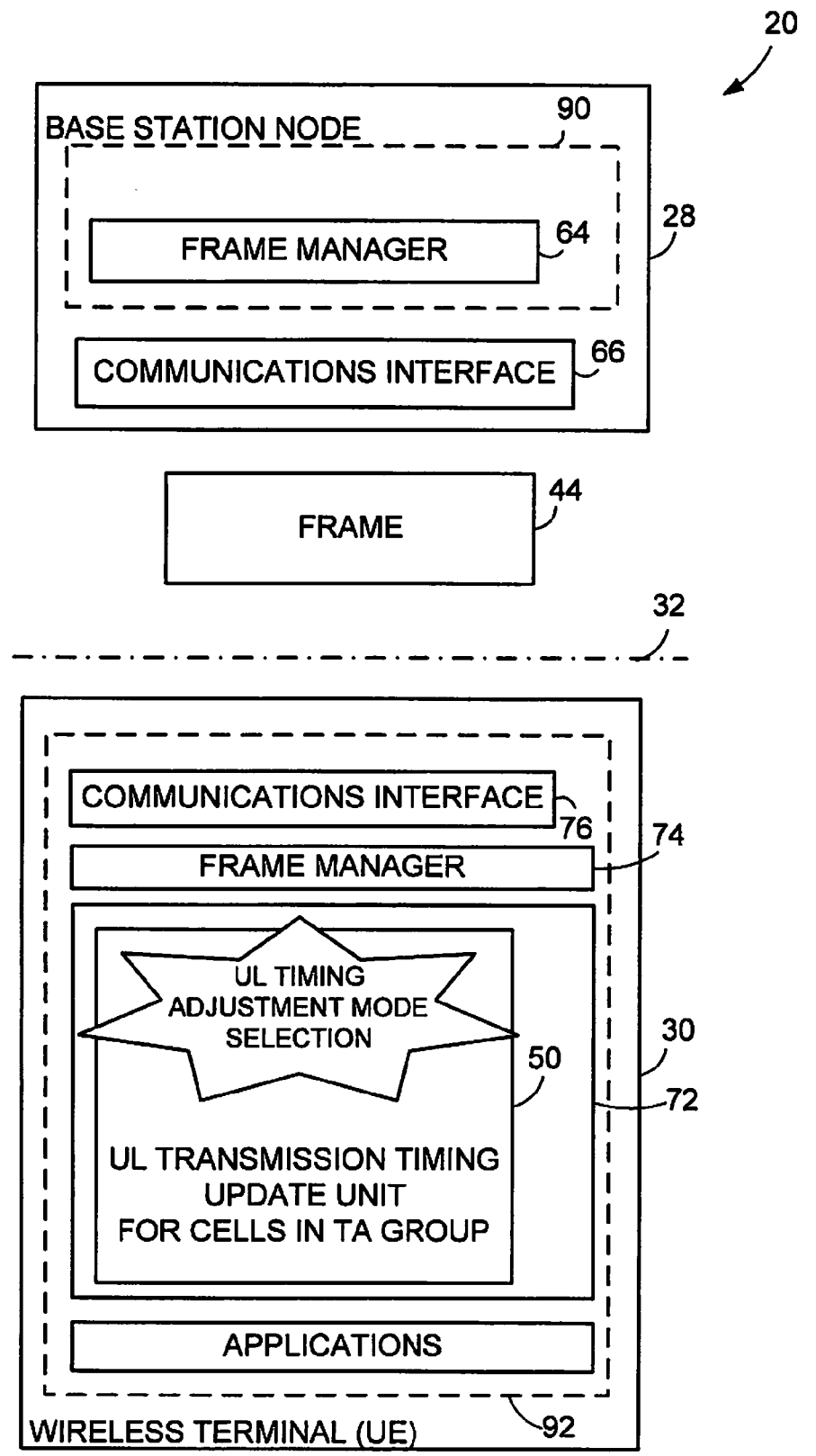
FIG. 22 is a schematic view of an example radio communications network according to an example embodiment wherein a wireless terminal makes a determination of a selected uplink (UL) timing adjustment mode.

According to another aspect of the technology disclosed herein, the selection of the method (e.g., one of the embodiments/modes of section 5.1-5.3 hereof) may also be done by the UE, and selected by the UE based on one or more pre-defined rules, in a manner illustrated by way of example in FIG. 22. These rules may be based on the same selection criteria as used by the network. These criteria are described below for network node; but they also apply if the selection is done by the UE.

Figure 25:
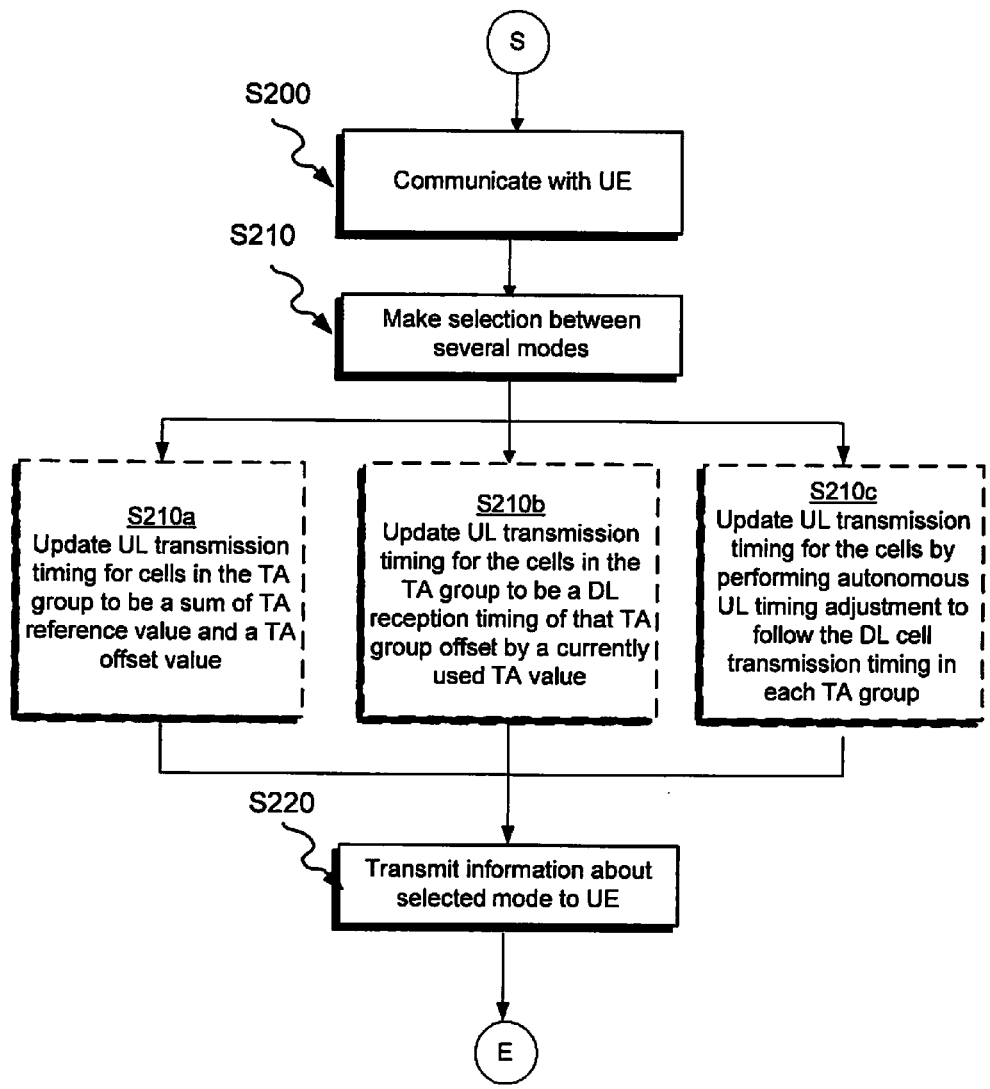
FIG. 25 is a flowchart illustrating a method according to an embodiment of the technology disclosed herein.

The above-mentioned embodiments or modes are illustrated in FIG. 25 as well. These embodiments may be implemented, or preformed, by a network node (e.g. eNB). The network node may communicate S200 information, over an air interface, with a UE. The network node is further capable of making a selection S210 of the most appropriate method or updating mode for UE UL timing adjustment. The different updating modes of which the network node may make its selection were described hereinabove with reference to sections 5.1-5.3 and will not be further detailed here.

Once the network node has made its selection, it is configured to transmit information about the selected updating mode to the UE in question. In some embodiments, the network node may also receive, from the wireless terminal, information that the wireless terminal is capable of updating UL transmission timing for serving cells in the TA group even when the TA timer for the associated TA group is not running.

5.5.1 Criteria for Selecting Method for UL Timing Adjustment

One criterion is based on UE capability if a particular method is not mandatory for the UE to support. For example as described in section 5.4 hereof, the network node (e.g. serving eNB) can decide which method to use depending upon UE capability. If a certain UE supports more than one method, then the network may use additional criteria. Examples of additional criteria are:

Residual transmission error after the UL timing adjustment. For example if the network wants minimum or no error then it may choose the method described in section 6.1 (i.e., where $T_e$ becomes zero).

Current UL transmission error. For example if the network is aware that the current transmission error is small then it may it may choose the method described in section 5.2 (e.g., where $T_e$ remain same as before TA timer expiry).

Frequent and/or large DL timing drifting. For example if the network is aware that the DL timing drift in one or more of the serving cells is frequent and/or large (e.g. 1-3 μs over 100 ms-1 second) then the network node may choose the method described in section 5.3 (e.g., where UE adjust timing even with no UL transmission).

A method can be selected based on criticality of data or services e.g. a method which leads to minimum error such as method in section 5.1 hereof may be selected if the data communicated between the network and UE is more critical or sensitive or delay sensitive, etc.

A more robust method may be selected for a TA group (TAG) in which cells contain more critical or important information or critical control information. For example the TAG containing the PCell may use more robust method such as methods in section 5.1 hereof or section 5.3 hereof. In other TAGs the network may select a less robust method as that described, e.g., in section 5.2 hereof Selection can also be based on a radio environment or radio channel characteristics e.g. depending upon UE speed, Doppler, multipath delay profile etc. For example in environment with large delay spread or more dispersive channels (e.g. urban channel or where delay spread is 2μ or more) the method in section 5.3 may be selected. This is because the cell timing may change over time due to channel characteristics and UE should follow the DL timing to adjust uplink timing even when there is no UL transmission.

5.5.2 Method in UE of Acquiring Information Related to Selected Method for UL Timing Adjustment As stated above, the UE can select a method (e.g., from one of the foregoing example embodiments/modes) based on network indication and/or autonomously based on pre-defined rule(s). This is described below:

5.5.2.1 Method in Network Node of Informing UE about the Selected Method for UL Timing Adjustment After selecting the method for a particular UE using one or more criteria the network node (e.g., serving eNode B) will inform the UE by sending a message or any indicator to use that particular method for UL timing adjustment. The network node may also send the configurable parameters to the UE depending upon the method of the UL timing adjustment (e.g. method in section 5.3 may require one or more set of parameters to be signaled to the UE). The network may also send additional information to the UE especially related to the method of adjusting the UL timing in different TAGs used by the UE. For example network may indicate to the UE whether the same method is used for all TAGs, for at least a group of TAGs or different method for different TAGs. It may also be pre-defined that by default (e.g. if not explicitly indicated by the network to the UE), the UE will use the same method for all TAGs. The network may send these set of information to the UE via a suitable signaling protocol between the network node and the UE e.g. RRC signaling and/or by MAC signaling.

Even if the UE selects a method autonomously based on a pre-defined rule, the network node may still send one or more parameters which are configurable, e.g., one or more parameters related to method in section 5.3, indication whether same or different methods to be used for all TAGs or not.

5.5.2.2 Method in UE of Using the Selected Method for UL Timing Adjustment

The UE upon receiving the information from the network node determines the method to be used for UL timing information. The UE starts using the selected method for one or more TAGs for adjusting UL timing according to the received information and/or pre-defined rules.

If the UE selects method(s) autonomously based on a pre-defined rule, then the UE may also inform the serving network node regarding the method it has used. It may also provide additional information to the serving network node. The information may also contain, e.g., time period over which a particular method is used for one or more TAGs, duration over which the method is used, etc. The serving network node may send the received information from the UE to other network nodes in real time. The radio network node may also collect statistics over certain period of time and report the statistics to the other network nodes. Examples of other network nodes are neighboring base stations (e.g. eNB sending to other eNB over an X2 interface), positioning node (E-SMLC in LTE), third node, MDT node, SON nodes, O&M node, OSS node, network monitoring node, network planning node etc. The receiving other network node and/or serving network node may use this information for one or more network management tasks. Examples of network management tasks are network/cell planning, configuration of network parameters, network dimensioning (e.g. deployment of number of nodes in a region), adjustment of time synchronization between cells (e.g. improving synchronization level), type of carrier aggregation (e.g. intra-band or inter-band) to be used, number of TAGs to be used in CA, etc.

6.0 Example Advantages

The following are a few example advantages of the technology disclosed herein:

DL timing drift generally creates an error in UL transmission timing. With the technology disclosed herein the error in UL transmission timing will be mitigated or removed completely.

Due to burst traffic or lack of resource assignment the UE may not transmit continuously in the UL. Thanks to the disclosed technology, even when there is no UL transmission the UE will still be able to adjust its transmit timing e.g. by following the DL timing of a reference timing cell. This in turn prevents the UE from transmitting with an erroneous transmission timing when it resumes UL transmission. Generally, the eNB receiver is tuned to certain expected UL transmission timing, which in turn is estimated based on e.g. any drift in the DL eNB transmit timing. Therefore an error or significant error in UL transmission timing will cause reception errors of the UL signal received at the eNB. The erroneous reception of signals will require retransmission of signals, which increases packet transmission delay and loss in UL throughput. However, by the virtue of the disclosed technology decoding problems of the UL signals at the eNB receiver can be eliminated or minimized and therefore improve UL performance.

Different methods for UL transmission timing adjustment may be selected for mitigating the timing error in different scenarios and according to different requirements.

7.0 Example Abbreviations

The following are among the abbreviations employed herein:

3GPP 3$^{rd}$ Generation Partnership Project
ACK Acknowledgement
AGW Access Gateway
AL Aggregation Layer
ARQ Automatic Repeat reQest
CA Carrier Aggregation
CC Component Carrier
CCE Control Channel Elements
CE Control Element
CFI Control Format Indicator
CP Cyclic Prefix
CRC Cyclic Redundancy Check
CRS Common Reference Symbols
C-RNTI Cell-Radio Network Temporary Identifier
DFT Discrete Fourier Transform
DL Downlink
DL-SCH Downlink Shared Channel
DRX Discontinuous reception
DTX Discontinuous transmission
eNB Evolve Node B (eNodeB)
E-UTRAN Evolved UTRAN
HARQ Hybrid ARQ
HO Handover
LTE Long Term Evolution
MAC Medium Access Control
MDT Minimization of drive tests
MSG Message
NACK Negative acknowledgement
NW Network
OFDM Orthogonal Frequency-Division Multiplexing
O&M Operational and Maintenance
OSS Operational Support Systems
PCC Primary component carrier
PCell Primary cell
PDCCH Physical Downlink Control Channel
PDSCH Physical Downlink Shared Channel
PRACH Physical Random Access Control Channel
PRB Physical Resource Block
pTAG PCell TAG
PUCCH Physical Uplink Control Channel
PUSCH Physical Uplink Shared Channel
RACH Random Access Control Channel
RA Random Access
RA-RNTI Random Access-Radio Network Temporary Identifier
RB Resource Block
RAN Radio Access Network RF Radio Frequency
RNC Radio Network Controller
RNTI Radio Network Temporary Identifier(s)
RRC Radio Resource Control
SAE System Architecture Evolution
SCC Secondary component carrier
SCell Secondary cell
SON Self Organizing Network
TA Timing Advance
TAC Timing Advance Command
TAG Timing Advance Group
TR Timing Reference
TC-RNTI Temporary Cell-Radio Network Temporary Identifier
sTAG SCell TAG
UE User Equipment
UL Uplink
UL-SCH Uplink Shared Channel
UMTS Universal Mobile Telecommunications System
UTRAN Universal Terrestrial Radio Access Network
VRB Virtual Resource Block
WCDMA Wideband Code Division Multiple Access Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby. Finally, reference signs in the claims are provided merely as a clarifying example and should not be construed as limiting the scope of the claims in any way.

The invention claimed is:

1. A wireless terminal comprising:
a communications interface configured to receive a timing advance command control element over a radio interface from a network node; and
an uplink (UL) transmission timing update unit configured, upon receipt of the timing advance command control element, to update UL transmission timing for cells in a timing advance (TA) group even when a TA timer for the associated TA group is not running and to keep a transmitter of the wireless terminal active even when not transmitting in the uplink in accordance with slew rate parameters selected for operation of the transmitter when the transmitter is not transmitting in the uplink, the slew rate parameters being parameters associated with the rate at which the wireless terminal performs UL timing adjustments.

2. The wireless terminal of claim 1, wherein the UL transmission timing update unit is a controller.

3. The wireless terminal of claim 1, wherein the UL transmission timing update unit is configured to update the UL transmission timing for the cells in the TA group to be a downlink (DL) reception timing of that TA group offset by a offset quantity.

4. The wireless terminal of claim 1, wherein the UL transmission timing update unit is configured to update UL transmission timing for the cells in the TA group to be a downlink (DL) reception timing of that TA group offset by a sum of a timing advance reference value ($N_{TA\_Ref}$) and a timing advance offset value ($N_{TA\_offset}$).

5. The wireless terminal of claim 1, wherein the UL transmission timing update unit is configured to update UL transmission timing for cells in a TA group to be a downlink (DL) reception timing of that TA group offset by a currently used timing advance value ($N_{TA}$).

6. The wireless terminal of claim 1, wherein the UL transmission timing update unit is configured to update UL transmission timing for cells in a TA group by performing autonomous UL timing adjustment to follow a downlink (DL) cell transmission timing in each TA group when the TA timer is not running even if there is no UL transmission on the concerned cells.

7. The wireless terminal of claim 1, wherein the UL transmission timing update unit is configured to update UL transmission timing for cells in a TA group by performing autonomous UL timing adjustment to follow a downlink (DL) cell transmission timing in each TA group when the TA timer is not running even if there is no UL transmission on the cells belonging to the same TA group.

8. The wireless terminal of claim 1, wherein the UL transmission timing update unit is further configured to adjust its UL timing for the cells in the TA group when there is an UL transmission and when there is no UL transmission by keeping the transmitter of the wireless terminal active even when not transmitting in the uplink.

9. The wireless terminal of claim 1, wherein the UL transmission timing update unit is further configured to adjust its UL timing regardless of whether there is an UL transmission by keeping the transmitter of the wireless terminal active even when not transmitting in the uplink.

10. The wireless terminal of claim 1, further comprising means for informing the network node that the wireless terminal is capable of updating UL transmission timing for cells in the TA group even when the TA timer for the associated TA group is not running.

11. The wireless terminal of claim 10, wherein the means for informing the network comprises a capabilities notification unit.

12. The wireless terminal of claim 10, wherein the means for informing the network comprises one of a transmitter and a transceiver.

13. The wireless terminal of claim 1, wherein the communications interface is configured to inform the network node that the wireless terminal is capable of updating UL transmission timing for cells in the TA group even when the TA timer for the associated TA group is not running.

14. The wireless terminal of claim 1, wherein the wireless terminal is further configured to make a selection between plural different updating modes for updating the UL transmission timing for the cells in the timing advance TA group even when the TA timer for the associated TA group is not running.

15. The wireless terminal of claim 14, wherein the wireless terminal is further configured to make the selection based on at least one of a received information from the network node and according to at least one pre-defined rule.

16. The wireless terminal of claim 1, wherein said cells in the TA group are serving cells in the TA group.

17. A method of operating a wireless terminal comprising:
receiving a timing advance command control element over a radio interface from a network node;

upon receipt of the timing advance command control element, updating uplink (UL) transmission timing for cells in a timing advance (TA) group even when a TA timer for the associated TA group is not running; and keeping a transmitter of the wireless terminal active even when not transmitting in the uplink in accordance with slew rate parameters selected for operation of the transmitter when the transmitter is not transmitting in the uplink, the slew parameters being parameters associated with the rate at which the wireless terminal performs UL timing adjustments.

18. The method of claim 17, further comprising: updating the UL transmission timing for the cells in the TA group to be a downlink (DL) reception timing of that TA group offset by an offset quantity.

19. The method of claim 17, further comprising updating the UL transmission timing for the cells in the TA group to be a downlink (DL) reception timing of that TA group offset by a sum of a timing advance reference value ($N_{TA\_Ref}$) and a timing advance offset value ($N_{TA\_offset}$).

20. The method of claim 17, further comprising updating the UL transmission timing for the cells in the TA group to be a downlink (DL) reception timing of that TA group offset by a currently used timing advance value ($N_{TA}$).

21. The method of claim 17, further comprising updating UL transmission timing for cells in a TA group by performing autonomous UL timing adjustment to follow a downlink (DL) cell transmission timing in each TA group when the TA timer is not running even if there is no UL transmission on concerned serving cells.

22. The method of claim 17, further comprising updating UL transmission timing for cells in a TA group by performing autonomous UL timing adjustment to follow a downlink (DL) cell transmission timing in each TA group when the TA timer is not running even if there is no UL transmission on the cells belonging to the same TA group.

23. The method of claim 17, further comprising updating the UL timing when there is an UL transmission and when there is no UL transmission keeping the transmitter of the wireless terminal active even when not transmitting in the uplink.

24. The method of claim 17, further comprising adjusting the UL timing regardless of whether there is an UL transmission by keeping the transmitter of the wireless terminal active even when not transmitting in the uplink.

25. The method of claim 17, further comprising informing the network node that that the wireless terminal is capable of updating UL transmission timing for cells in the TA group even when the TA timer for the associated TA group is not running.

26. The method of claim 17, further comprising making a selection between plural different updating modes for updating the UL transmission timing for the cells in the TA group even when the TA timer for the associated TA group is not running.

27. The method of claim 26, further comprising making the selection based on at least one of a received information from the network node and according to at least one predefined rule.

* * * * *